US009695902B2

(12) United States Patent
Kadowaki et al.

(10) Patent No.: US 9,695,902 B2
(45) Date of Patent: Jul. 4, 2017

(54) LIQUID SEALED VIBRATION ISOLATING DEVICE

(71) Applicants: YAMASHITA RUBBER KABUSHIKI KAISHA, Fujimino-shi, Saitama (JP); HONDA MOTOR CO., LTD., Tokyo (JP)

(72) Inventors: Hirokazu Kadowaki, Fujimino (JP); Nobuo Kubo, Wako (JP)

(73) Assignees: YAMASHITA RUBBER KABUSHIKI KAISHA, Fujimino-Shi (JP); HONDA MOTO CO., LTD, Tokyo (JP)

(*) Notice: Subject to any disclaimer, the term of this patent is extended or adjusted under 35 U.S.C. 154(b) by 0 days.

(21) Appl. No.: 14/654,004

(22) PCT Filed: Dec. 18, 2013

(86) PCT No.: PCT/JP2013/083943
§ 371 (c)(1),
(2) Date: Jun. 19, 2015

(87) PCT Pub. No.: WO2014/098148
PCT Pub. Date: Jun. 26, 2014

(65) Prior Publication Data
US 2015/0316121 A1 Nov. 5, 2015

(30) Foreign Application Priority Data

Dec. 20, 2012 (JP) .................. 2012-278762

(51) Int. Cl.
F16F 13/10 (2006.01)
B60K 5/12 (2006.01)
(52) U.S. Cl.
CPC .......... *F16F 13/106* (2013.01); *B60K 5/1208* (2013.01)

(58) Field of Classification Search
CPC .. F16F 13/10; F16F 13/08; F16F 13/14; F16F 13/105; F16F 13/106; B60K 5/1208; B60K 5/12
(Continued)

(56) References Cited

U.S. PATENT DOCUMENTS

2008/0284075 A1* 11/2008 Saito ..................... F16F 13/105
267/140.13
2010/0072683 A1 3/2010 Saito et al.
(Continued)

OTHER PUBLICATIONS

International Search Report, Date of mailing: Jan. 28, 2014.

*Primary Examiner* — Melanie Torres Williams
(74) *Attorney, Agent, or Firm* — Rankin, Hill & Clark LLP

(57) ABSTRACT

A liquid sealed vibration isolating device is integrally provided with an elastic movable diaphragm and a relief valve. A pair of parallel straight line sections is on opposite sides of a circular elastic partition member. The elastic movable diaphragm includes a center of the elastic partition member and is surrounded by a pair of opposed circular arc sections and a pair of straight line sections formed by cutting an outer circumferential part of the elastic partition member. The relief valve is radially outward of the straight line section of the elastic partition member. A part of the elastic movable diaphragm reaches the circular arc section corresponding to the outer circumferential part of the elastic partition member so as to be increased in area as much as possible to absorb an internal pressure of a primary liquid chamber and to achieve low dynamic spring.

20 Claims, 17 Drawing Sheets

(58) Field of Classification Search
USPC .................................................. 267/140.13
See application file for complete search history.

(56) References Cited

U.S. PATENT DOCUMENTS

2011/0101581 A1  5/2011  Kubo et al.
2012/0049423 A1  3/2012  Ishikawa et al.
2012/0299229 A1  11/2012 Kubo et al.

* cited by examiner

LIQUID SEALED VIBRATION ISOLATING DEVICE

TECHNICAL FIELD

The present invention relates to a relief valve for preventing cavitation, which is provided in a liquid sealed vibration isolating device, and more particularly, to the liquid sealed vibration isolating device having the relief valve integrally provided in an outer circumferential part of a circular elastic partition member which partitions a liquid chamber into a primary liquid chamber and a secondary liquid chamber.

In the present invention, as a rule, a radial direction shall be a radial direction of the elastic partition member. In addition, since the relief valve is formed long along an outer circumferential circle of the elastic partition member in the circumferential direction of the elastic partition member, the direction along the circumferential direction of the outer circumferential circle shall be a longitudinal direction of the relief valve. The same is applicable to the prior art as will be referred to hereunder.

BACKGROUND ART

In a liquid sealed vibration isolating device such as an engine mount, an elastic partition member is provided in a partition member for partitioning a liquid chamber into a primary liquid chamber and secondary liquid chamber, in order to absorb an internal pressure of the primary liquid chamber. A relief valve is integrally provided in an outer circumferential part of the elastic partition member. When the cavitation generating condition where the cavitation is generated in the primary liquid chamber has been created at the time an excessive amplitude vibration such as to generate the cavitation is inputted, the relief valve is opened so as to leak hydraulic liquid of the secondary liquid chamber into the primary liquid chamber, so that the hydraulic pressure of the primary liquid chamber is heightened to thereby prevent the cavitation. This type of the vibration isolating device is known to the public.

FIG. 15 is a plan view of the elastic partition member 100 as referred to above. The elastic partition member 100 is formed in a circular shape and retained in fitting engagement with a rigid part of a partition member. An elastic movable diaphragm 110 is located in a center part of the elastic partition member 100, and a thick rigid frame section 120 is located in the form of a concentric circle in an outer circumference of the elastic movable diaphragm 110 and configured to fix an outer circumferential portion of the elastic movable diaphragm 110. In the radial direction of the elastic partition member 100, a relief valve 130 is integrally formed outwardly of the rigid frame section 120. An opening angle θ of the relief valve 130 in relation to the rigid frame section 120 is constant in the longitudinal direction.

A plurality (four in this example) of relief valves 130 are provided on the outer circumferential portion of the elastic movable diaphragm 110 at proper spaced intervals in the circumferential direction and are easy to bend relative to the rigid frame section 120 by a bending groove 140 which is formed along an outside of the rigid frame section 120 and opened to the primary liquid chamber.

An enlarged part of the drawing is a cross sectional view of a part of the relief valve 130. In this cross section, the relief valve 130 extends radially outwardly from the rigid frame section 120 and obliquely upwardly toward the primary liquid chamber so as to project into a leak passage 150.

The leak passage 150 is a passage which is provided in the rigid part of the partition member for retaining the elastic partition member 100 in an engagement relationship and which provides communication between a primary liquid chamber 170 and a secondary liquid chamber 180. The leak passage 150 is closed when a distal end of the relief valve 130 comes into sealing contact with an inner wall 160 of the leak passage 150, and is opened when the distal end of the relief valve 130 is brought out of contact with the inner wall 160 of the leak passage 150, whereby to provide communication between the primary liquid chamber 170 and the secondary liquid chamber 180. At the time the cavitation generating condition is not satisfied (at the time of the normal condition), the leak passage 150 is closed.

When meeting the cavitation generating condition, since the primary liquid chamber 170 side becomes a negative pressure, the hydraulic liquid within the leak passage 150 pushes up and opens the relief valve 130 from the secondary liquid chamber 180 side so as to create a relief valve opening condition where the hydraulic liquid is leaked and flows from the secondary liquid chamber 180 side into the primary liquid chamber 170, so that the hydraulic pressure of the primary liquid chamber 170 is heightened thereby to prevent the generation of the cavitation.

FIG. 16 is a plan view of the partition member 200. The partition member 200 has a circular rigid member 210 made of metal and the like for supporting the elastic partition member 100 and is formed with an opening portion 220 at a center thereof. An annular fixing section 230 is provided around the opening portion 220, and the rigid frame section 120 is fixed on this fixing section 230. The elastic movable diaphragm 110 surrounded by the rigid frame section 120 is visible through the opening portion 220.

In an outer circumferential side of the fixing section 230, valve openings 240 are formed on a concentric circle of the fixing section 230 at 90° intervals. Each of the relief valves 130 faces the valve opening 240.

PRIOR ART REFERENCE

Patent reference 1: Japanese Patent Application Laid-Open Publication JP 2009-52675 A.

DISCLOSURE OF THE INVENTION

Problem to be Solved by the Invention

FIG. 17 shows a condition where the relief valve 130 is opened. The relief valve 130 is elastically deformed in such a way as to be bent toward the rigid frame 120, and the distal end side at the middle portion in the longitudinal direction of the relief valve 130 comes into contact with the rigid frame 120 and becomes an open condition so as to open the leak passage 150.

However, each of the end portions in the longitudinal direction of the relief valve 130 is high in rigidity and hard to be opened. Therefore, a gap is created between the end portion and the rigid frame 120, so that there are formed incomplete operating portions 190 at which the opening of the relief valve 130 is incomplete. Moreover, since the part excluding the end portions in the longitudinal direction of the relief valve 130 is constant in valve length and has substantially uniform rigidity, the middle portion in the longitudinal direction of the relief valve 130 which is relatively lowest in rigidity is deformed first in such a way as to be pressed against the rigid frame 120. When the middle portion comes into contact with the rigid frame 120, then, an intermediate portion between the middle portion in the longitudinal direction and each of the end portions in the longitudinal direction is deformed and pressed against the rigid frame 120. Accordingly, the deformation occurs in a wavy form in the circumferential direction, and the incomplete operating portions 190 are created in dispersed fashion whereby locations in which the incomplete operating portions 190 are created are increased. Therefore, the region forming the incomplete operating portions 190 as a whole is extended so that an opening area is lessened.

A reference character A in the drawing is an outline of an outer circumferential portion of the relief valve 130 in a closed condition, and B is an outline of the outer circumferential portion in an open condition. An area (hatching portion C) between A and B is the opening area. A reference character D is a maximum amount of displacement at the time the relief valve 130 is opened. The maximum amount of displacement is produced at the middle portion in the longitudinal direction.

For instance, when a valve opening area is S, there may be cases where it is set to S=about 164 mm². In this setting, as shown in an enlarged part K of the drawing, when an initial area which is an area at the time the relief valve 130 is closed is E, E=about 263 mm² in this example, and a valve opening rate F=S/E=164/263=about 62%. The relief valve 130 is more effectively utilized as the valve opening rate F is increased, so that the valve opening rate will be an index which indicates the valve performance.

By the way, it is conceivable that, in order for improving the valve performance, the initial area of the relief valve 130 is increased so as to make larger the opening area at the time of being opened. However, when the initial area of the relief valve 130 is increased under conditions where the elastic partition member 100 is fixed, an area of the elastic movable diaphragm 110 becomes relatively smaller to thereby injure the lowering of the dynamic spring. Namely, the expansion of the initial area E of the relief valve 130 and the expansion of the area of the elastic movable diaphragm 110 are incompatible. In addition, since the rigid frame 120 in FIG. 17 is of circular arc shape and enters the relief valve 130 side, the initial area of the relief valve 130 is small and the valve opening rate also becomes smaller. Then, it is required to provide the relief valve which can be decreased in size in such a way as to increase the area of the elastic movable diaphragm 110 thereby to achieve the low dynamic spring while having the high valve opening rate and the good valve performance.

It is therefore an object of the present invention to realize the above requirement.

Means for Solving the Problem

In order to achieve the above object, according to a first feature of the present invention, there is provided a liquid sealed vibration isolating device comprising a partition member (20) for partitioning a liquid chamber into a primary liquid chamber (22) and a secondary liquid chamber (24), a damping orifice (28) being arranged in the partition member (20) to provide communication between the primary liquid chamber (22) and the secondary liquid chamber (24), an elastic partition member (30) being provided in the partition member (20), the elastic partition member being integrally provided with an elastic movable diaphragm (32) which absorbs an internal pressure of the primary liquid chamber (22) and a relief valve (36) which is arranged in an outer circumferential part, and a leak passage (40) to be opened and closed by the relief valve (36), being arranged in the partition member (20) to provide communication between the primary liquid chamber (22) and the secondary liquid chamber (24), wherein the elastic movable diaphragm (32) is surrounded by an annular rigid frame section (34) of noncircular shape formed by a curved line portion (P) and a straight line section (Q) and is formed in a noncircular shape, and the relief valve (36) is provided in a part located outwardly of the straight line section (Q) and formed in an oblong shape along an outer circumference of the elastic partition member (30).

According to a second feature of the present invention, in addition to the first feature, the elastic partition member (30) is formed in a circular shape, the curved line portion is formed of a circular arc section (P) corresponding to a portion of an outer circumferential circle (R) of the elastic partition member (30), and the straight line section (Q) forms a chord of the outer circumferential circle (R).

According to a third feature of the present invention, in addition to the first or second feature, a valve length which is a length of the relief valve (36) is increased as approaching a middle portion in the longitudinal direction of the relief valve (36).

According to a fourth feature of the present invention, in addition to the third feature, the relief valve (36) extends outwardly in the radial direction of elastic movable diaphragm (32) in such a way as to be opened in spreading fashion toward the primary liquid chamber (22), wherein a valve angle which is an opening angle of the relief valve (36) changes so as to be gradually decreased as approaching the middle portion in the longitudinal direction.

According to a fifth feature of the present invention, in addition to any one of the first to fourth features, a bending groove (52) is provided in a base portion of the relief valve (36), wherein the bending groove (52) is opened toward the primary liquid chamber (22) and has a straight line portion extending in parallel with the straight line section (Q).

According to a sixth feature of the present invention, in addition to the fifth feature, each of end portions (52a) in the longitudinal direction of the bending groove (52) is bent toward the elastic movable diaphragm (32).

According to a seventh feature of the present invention, in addition to any one of the first to sixth features, the straight line sections (Q) are located in pairs in opposite positions across a center (O) of the elastic partition member (30), and the elastic movable diaphragm (32) is formed in a width across flat shape having the pair of straight line sections (Q).

Effects of the Invention

According to the first feature of the present invention, the elastic movable diaphragm (32) and the relief valve (36) are integrally provided in the elastic partition member (30), and the annular rigid frame section (34) surrounding the elastic movable diaphragm (32) is of noncircular shape formed by the curved line portion (P) and the straight line section (Q). When this rigid frame section (34) is fixed in position, an outer periphery of the elastic movable diaphragm (32) having the noncircular shape is fixed, whereby the elastic movable diaphragm (32) can be located on an inside of the rigid frame section (34) in a noncircular form.

Further, the relief valve (36) is provided in the part located outwardly of the straight line section (Q) and formed in an oblong shape along the outer circumference of the elastic partition member (36).

Therefore, unlike the case where the relief valve on the outer circumferential side and the elastic movable diaphragm on the inner circumferential side are arranged in the form of concentric circles as disclosed in the prior art example, an area of the elastic movable diaphragm (32) can be expanded enough. Moreover, when the base portion of the relief valve (36) is formed by the straight line section (Q), an initial area of the relief valve (36) can be increased and the valve opening rate can be increased. Accordingly, also in the case where the relief valve (36) is integrally provided, the area of the elastic movable diaphragm (32) can be increased as much as possible, and the lowering of the dynamic spring can be realized.

According to the second feature of the present invention, the elastic partition member (30) is formed in a circular shape, and the straight line section (Q) forming the chord of the outer circumferential circle (R) is provided. Therefore, the rigid frame section (34) of non annular shape can be formed by the circular arc section (P) corresponding to a portion of the outer circumferential circle (R) and the straight line section (Q) forming the chord. In addition, the elastic movable diaphragm (32) may be formed in a non-circular shape such as a cut-out circle shape or a width across flat shape.

According to the third feature of the present invention, since the valve length which is the length of the relief valve (36) in the radial direction of the elastic movable diaphragm (32) changes in such away as to be increased as approaching the middle portion in the longitudinal direction of the relief valve (36), the valve rigidity also may be varied in such a way as to be gradually decreased toward the middle portion in the longitudinal direction.

Therefore, since the opening area is increased at the middle portion side in the longitudinal direction and the incomplete operating portion is decreased at the end portion side in the longitudinal direction, the relief valve is easy to be opened at its full length whereby to improve the valve opening rate.

As a result, since the valve performance is improved, the flow resistance is lowered thereby making it possible to decrease the cavitation. Moreover, since the relief valve (36) is able to be decreased in size as the valve opening rate is increased. Therefore, even if the elastic movable diaphragm (32) is enlarged, the relief valve (36) is provided integral with the elastic movable diaphragm (32) while maintaining the predetermined performance.

Further, the middle portion in the longitudinal direction is able to be easily opened at the promptest timing, so that the cavitation can be suppressed effectively.

According to the fourth feature of the present invention, since the relief valve (36) is opened in spreading fashion toward the primary liquid chamber (22) and the valve angle changes in such a way as to be gradually decreased as approaching the middle portion in the longitudinal direction, the valve length is gradually lengthened toward the middle portion in the longitudinal direction.

Accordingly, the valve angle at the ends in the longitudinal direction of the relief valve (36) is increased and the valve length at the middle portion in the longitudinal direction is lengthened, so that the quick opening of the relief valve (36) can be carried out and the relief valve (36) can be operated promptly by a small pressure whereby it is possible to decrease the generation of the cavitation.

According to the fifth feature of the present invention, since the bending groove (52) is provided in the base portion of the relief valve (36) which is opened toward the primary liquid chamber (22), the relief valve (36) can be easily bent from the bending groove (52) as a starting point.

In addition, since the bending groove (52) has the straight line portion extending in parallel with the straight line section (Q), the valve length of the relief valve (36) located radially outwardly of the straight line portion can be made changeable.

According to the sixth feature of the present invention, since both the end portions (52a) in the longitudinal direction of the bending groove (52) are bent inwardly, the incomplete operating portion which is an obstacle to bending the relief valve is reduced and the end portions in the longitudinal direction which are highest in valve rigidity can be easily opened.

According to the seventh feature of the present invention, since the elastic movable diaphragm (32) is formed in a width across flat shape, the relief valves (36) can be provided in pairs in the opposite positions by utilizing outsides of the width across flat shaped part of the elastic partition member (30), and it is possible to secure the sufficient opening area by the pair of relief valves (36).

BEST MODE FOR CARRYING OUT THE INVENTION

Hereinafter, a liquid sealed vibration isolating device embodied as an engine mount for a motor vehicle will be described with reference to the accompanying drawings.

Figure 1:
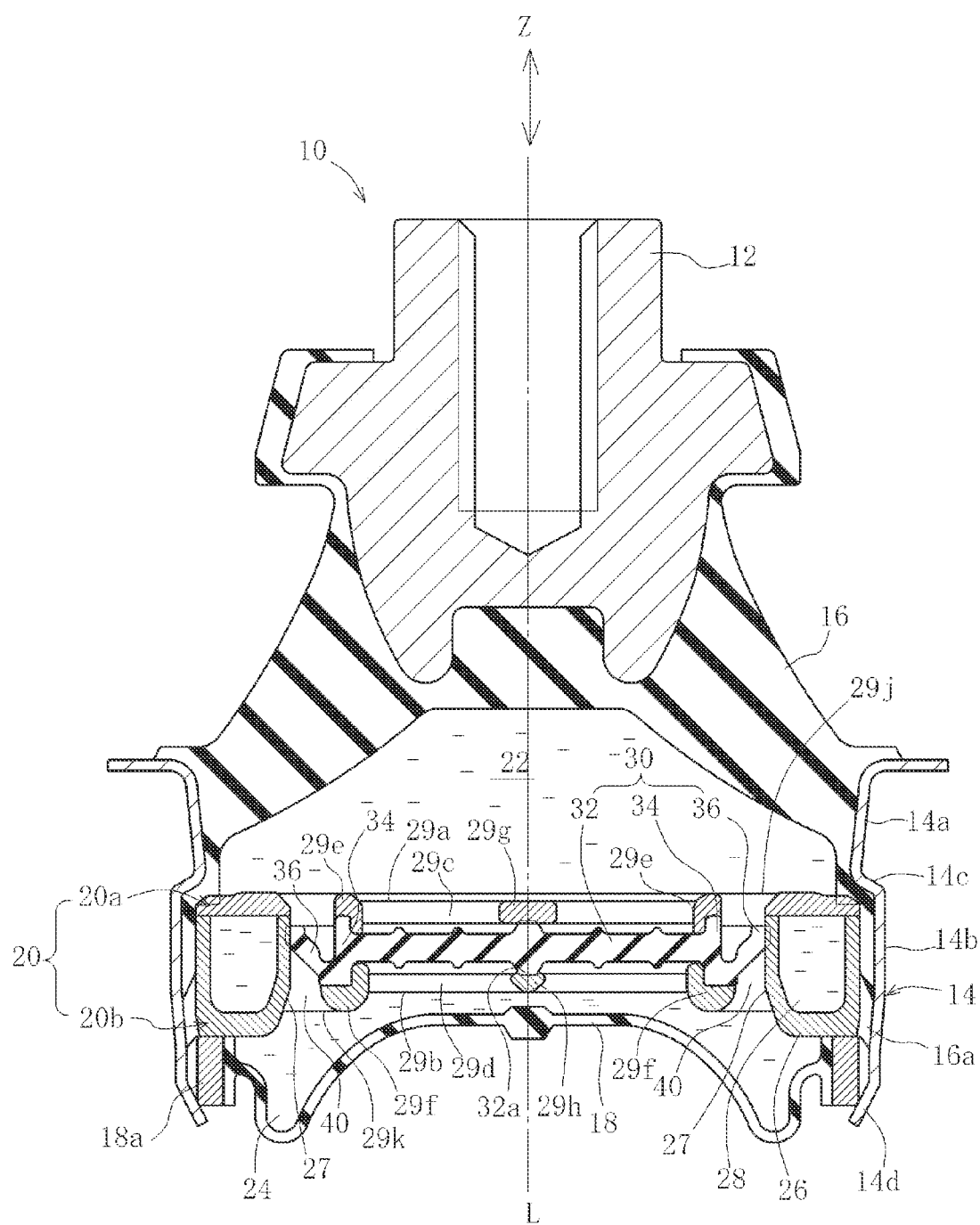
FIG. 1 is a vertical cross sectional view of an engine mount in accordance with an embodiment of the present invention.
Figure 2:
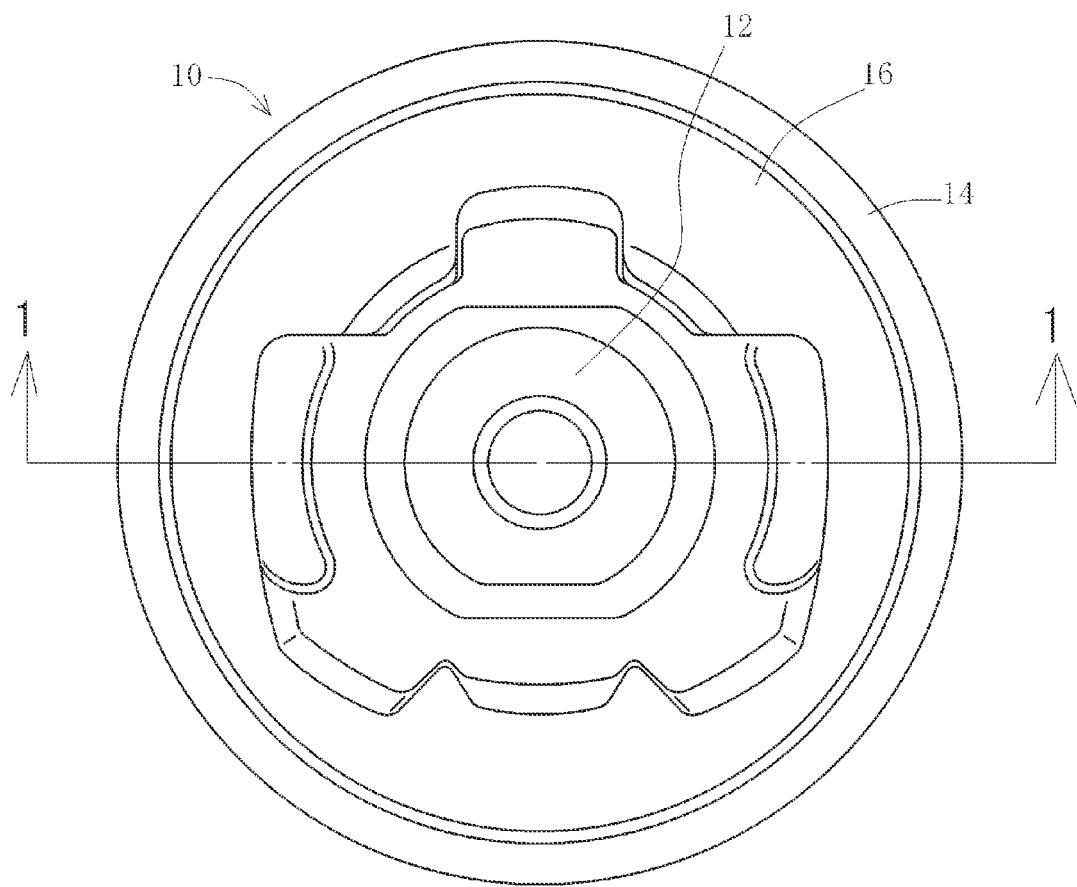
FIG. 2 is a plan view of the above engine mount.
Figure 3:
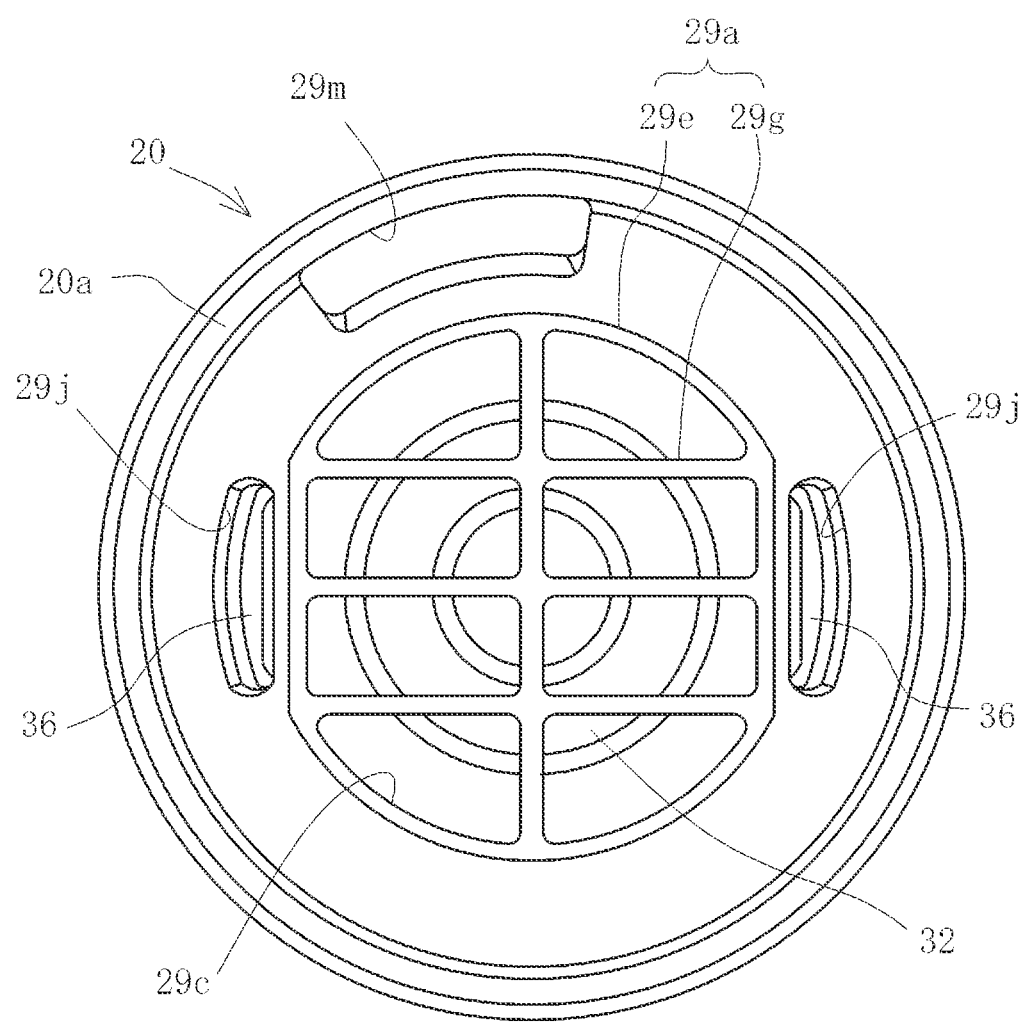
FIG. 3 is a plan view of a partition member.

FIG. 1 is a vertical cross sectional view of an engine mount 10 (taken on line 1-1 of FIG. 2) in accordance with an embodiment of the present invention. FIG. 2 is a plan view of the engine mount 10. FIG. 3 is a plan view of a partition member 20 when viewed from a primary liquid chamber 22 side.

In the present invention, with respect to the orientation such as "upper", "lower", "left" and "right", the upward and downward direction along a center axis L of the engine mount 10 in FIG. 1 shall be referred to as "upper" and "lower", and the direction orthogonal to the center axis L shall be referred to as "left" and "right". Further, Z direction extending along the center axis L shall be referred to as an input direction of a main vibration.

Referring to FIGS. 1 to 3, the engine mount 10 includes a first metal attachment 12 to be mounted on an engine side (vibration source side, not shown in the drawing), for instance, a second cylindrical metal attachment 14 to be mounted on a vehicle body side (vibration transmitted side, not shown in the drawing), and an insulator 16 made of an elastic member such as rubber or the like for elastically connecting the first metal attachment 12 and the second metal attachment 14.

The insulator 16 is an elastic body of substantially circular truncated cone shape functioning as a vibration isolating main body and has a space, at an inside thereof, which is surrounded by the second metal attachment 14. An opening of the space is closed by a diaphragm 18 so as to provide a sealed space, and a liquid chamber filled with an incompressible liquid is formed in this sealed space.

This liquid chamber is partitioned by a partition member 20 into a primary liquid chamber 22 on the side of the insulator 16 and a secondary liquid chamber 24 on the side of the diaphragm 18.

The partition member 20 has an orifice forming section 26 of hollow ring shape located in an outer peripheral part thereof and an elastic partition member 30 located on an inward side thereof.

In the orifice forming section 26 there is provided a damping orifice 28 which provides communication between the primary liquid chamber 22 and the secondary liquid chamber 24. The damping orifice 28 creates liquid column resonance due to a predetermined low frequency large amplitude vibration to thereby achieve high damping.

The partition member 20 is divided up and down into an upper member 20a and a lower member 20b and formed by combining these members in the upward and downward direction. On an outer circumferential side of the partition member 20 there is provided the orifice forming section 26, and on the inward side of the orifice forming section 26 there is formed a space a periphery of which is surrounded by an inner wall portion 27 of the orifice forming section 26. This space serves as an accommodating part of the elastic partition member 30. The accommodating part of the elastic partition member 30 is covered with the upper member 20a and the lower member 20b from above and below and provides communication between the primary liquid chamber 22 and the secondary liquid chamber 24 through opening portions 29c and 29d each of which is formed in the upper member 20a and the lower member 20b. The accommodating part of the elastic partition member 30 is partitioned in the upward and downward direction by the elastic partition member 30.

The elastic partition member 30 is composed of an elastic movable diaphragm 32 located in a central part thereof, a rigid frame section 34 located in an outer circumferential part thereof, and a relief valve 36 provided on an outer circumferential side of the rigid frame section 34 and formed in substantially a V-shaped cross section opened toward the secondary liquid chamber 24.

As shown in FIG. 3, the upper member 20a is a circular metal plate and provided with a displacement regulating section 29a at a center thereof. The opening portions 29c are provided in the displacement regulating section 29a. An annular fixing portion 29e and a grid-like fixing portion 29g are provided around the opening portions 29c. The annular fixing portion 29e is formed in such a way as to surround an outer circumference of the displacement regulating section 29a. The grid-like fixing portion 29g is integrally formed with the annular fixing portion 29e and located inwardly of the annular fixing portion 29e in grid-like fashion.

The annular fixing portion 29e and the grid-like fixing portion 29g correspond to remaining portions when the plurality of opening portions 29c are formed in the displacement regulating section 29a. The annular fixing portion 29e is of width across flat shape, and a valve opening 29j is provided on each of outer peripheral sides of the width across flat region. The valve opening 29j provides communication between the primary liquid chamber 22 and a leak passage 40 as will be referred to later. A reference character 29m designates a primary liquid chamber side opening of the damping orifice 28.

A bottom plan view of the lower member 20b is substantially similar to the upper member 20a, and, as shown in cross section in FIG. 1, a displacement regulating section 29b is provided in a center location and the opening portions 29d are provided in this displacement regulating section 29b. In addition, an annular fixing portion 29f and a grid-like fixing portion 29h are provided around the openings 29d. Moreover, a valve opening 29k is provided to provide communication between the secondary liquid chamber 24 and the leak passage 40. A secondary liquid chamber side opening of the damping orifice 28 is formed in a part which is not shown in the drawing, and communicates with the secondary liquid chamber 24.

Referring again to FIG. 1, the rigid frame section 34 is held and fixed between the annular fixing portions 29e and 29f from above and below. Further, when the rigid frame section 34 located in the outer circumferential part is fixed in position, the elastic movable diaphragm 32 is elastically deformable under the hydraulic pressure fluctuation of the primary liquid chamber 22, and an amount of displacement at the time of elastic deformation is regulated within a predetermined range by the grid-like fixing portions 29g and 29h.

When the hydraulic liquid within the primary liquid chamber 22 and the secondary liquid chamber 24 flows through the opening portions 29c and 29d, the elastic movable diaphragm 32 is elastically deformed so as to absorb the internal pressure fluctuation of the primary liquid chamber 22. In the wake of the elastic deformation of the elastic movable diaphragm 32, the hydraulic liquid flows through the opening 29c between the primary liquid chamber 22 and an upper surface side of the elastic movable diaphragm 32 located in the accommodating part of the elastic movable diaphragm 30, so that the liquid column resonance is created at a predetermined frequency of a relatively high frequency side. Hereinafter, this resonance shall be referred to as hole resonance. The hole resonance means the liquid column resonance due to the liquid flow through the opening 29c.

Between each of the fixing portions 29e and 29f and the inner wall portion 27 of the orifice forming section 26 there is provided the leak passage 40 which provides communication between the primary liquid chamber 22 and the secondary liquid chamber 24 and which is opened and closed by the relief valve 36. When a distal end of the relief valve 36 comes into contact with a wall surface of the inner wall portion 27 facing the leak passage 40, the leak passage 40 is in a closed condition, so that the leak passage 40 is shut off between the primary liquid chamber 22 and the secondary liquid chamber 24.

When the distal end of the relief valve 36 is brought out of contact with the inner wall portion 27 and bent toward the rigid frame section 34, the leak passage 40 is in an open condition, so that the leak passage 40 provides communication between the primary liquid chamber 22 and the secondary liquid chamber 24 whereby to communicate through the valve opening 29*j* with the primary liquid chamber 22 and through the valve opening 29*k* with the secondary liquid chamber 24.

An outer circumferential portion of the diaphragm 18 is integrally combined with a metallic fixing ring 18*a* of a ring shape. The fixing ring 18*a* contacts a bottom portion of the orifice forming section 26. When a lower end portion 14*d* of the second metal attachment 14 is bent inwardly and caulked, the orifice forming section 26 is fixed in position. An inner circumferential surface of the second metal attachment 14 is integrally combined with a thin seal portion 16*a* which is continuous with a portion of the insulator 16. The seal portion 16*a* is interposed between each of outer circumferential portions of the orifice forming section 26 and the fixing ring 18*a* and the inner circumferential portion of the second metal attachment 14 so as to seal the liquid and to isolate the vibration.

An upper part of the second metal attachment 14 is narrowed to form a small diameter portion 14*a*, and a step portion 14*c* is provided between this small diameter portion 14*a* and a lower large diameter portion 14*b*. An upper portion of the orifice forming section 26 is fixed in position by the step portion 14*c*.

Figure 4:
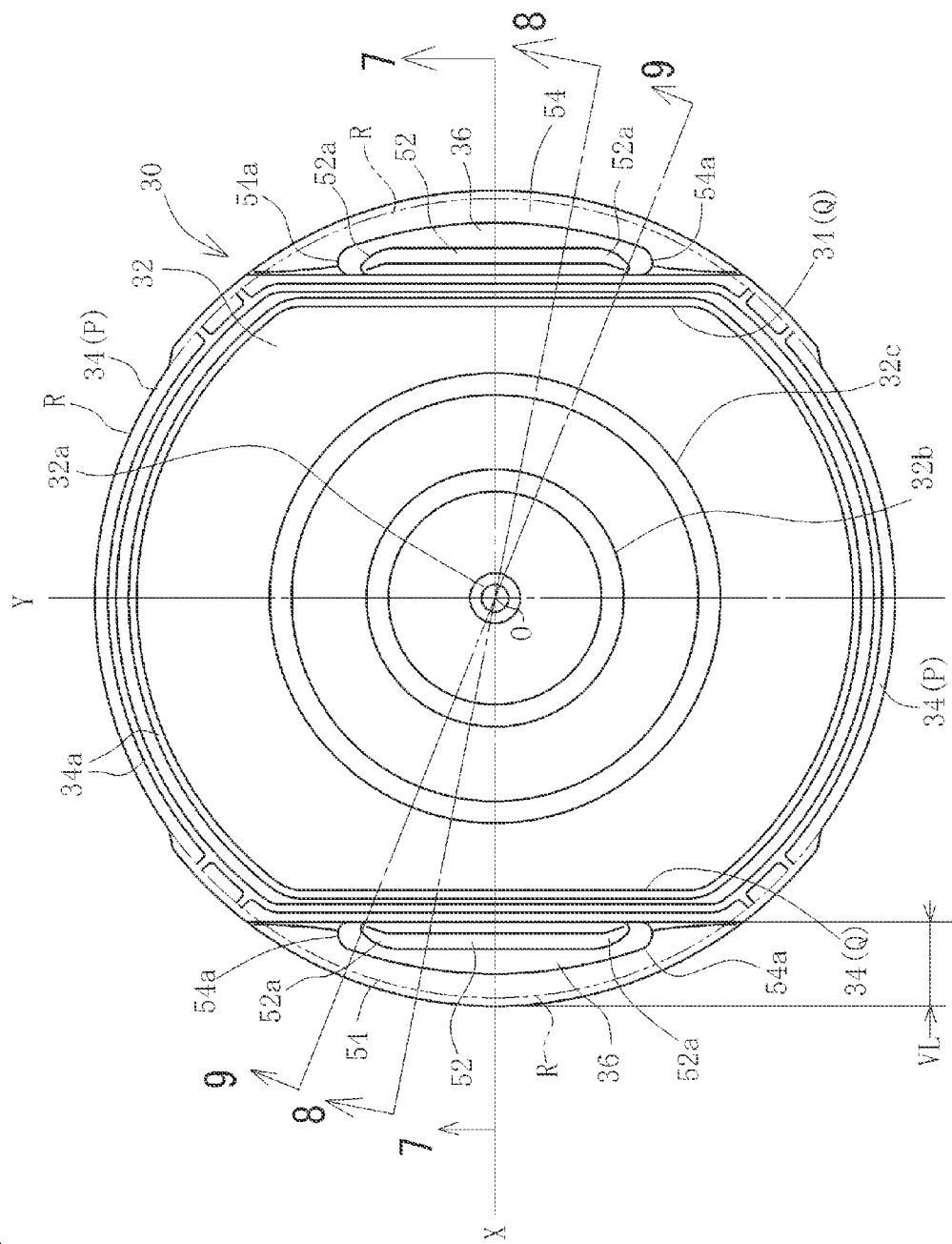
FIG. 4 is a plan view of an elastic partition member of the above engine mount.
Figure 5:
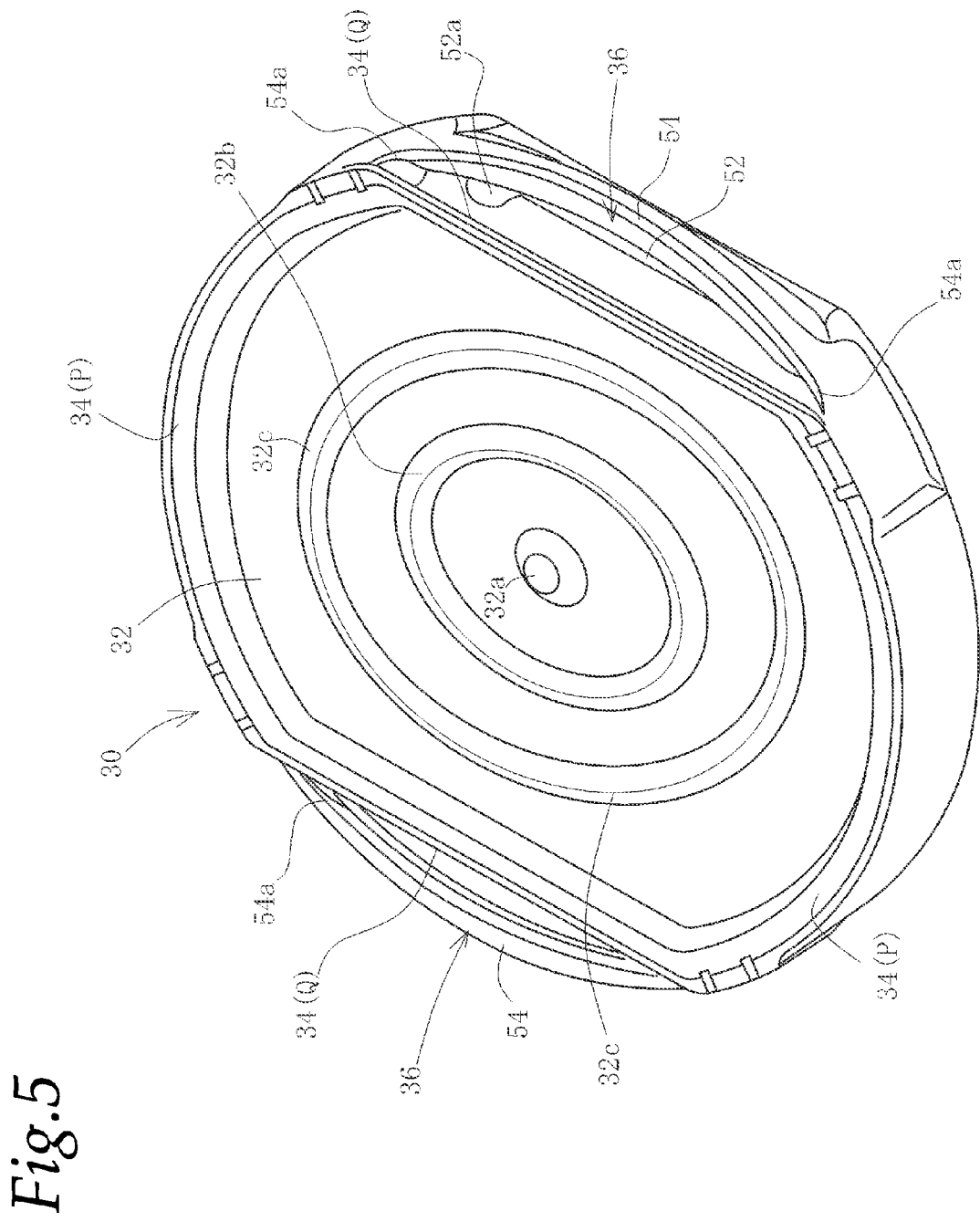
FIG. 5 is a perspective view of the above elastic partition member.
Figure 6:
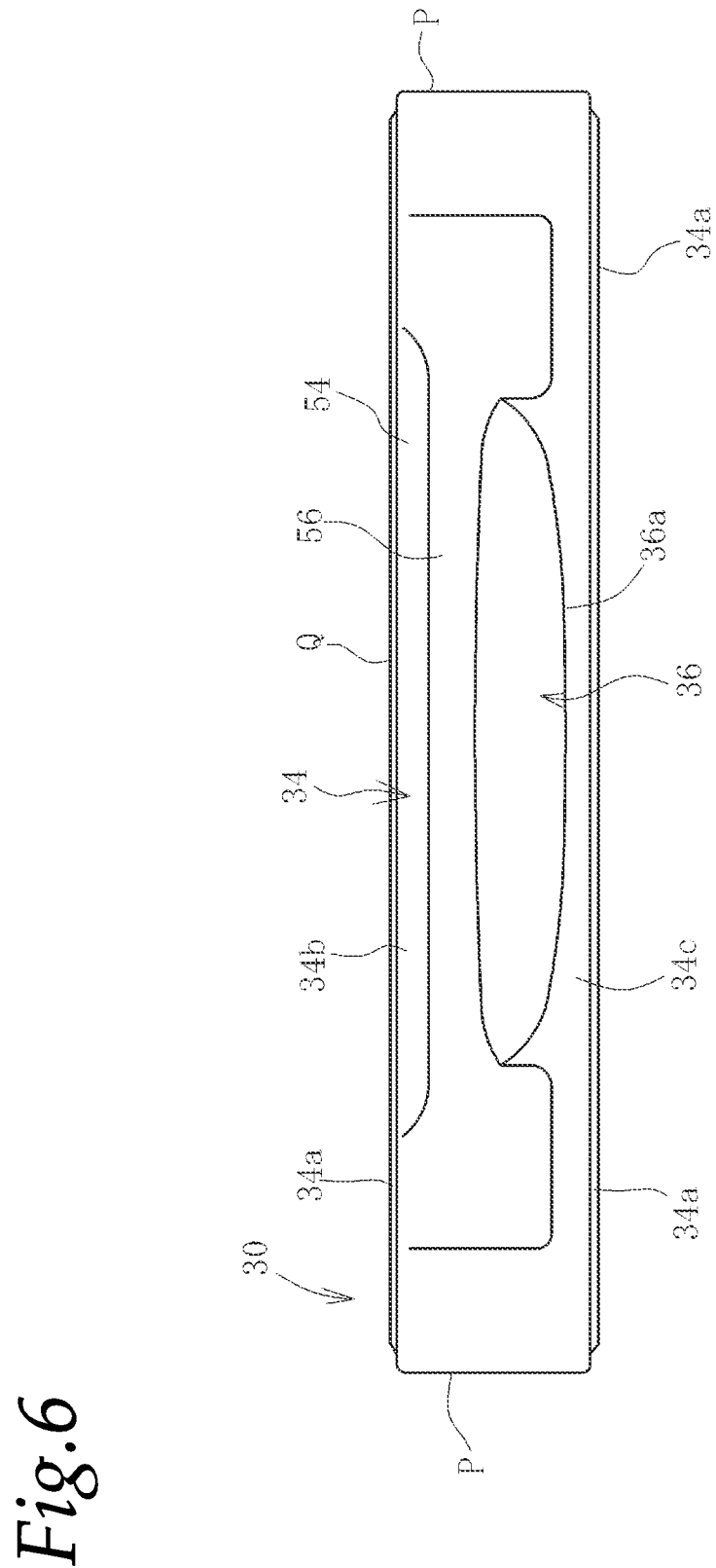
FIG. 6 is a side view of the above elastic partition member.
Figure 7:
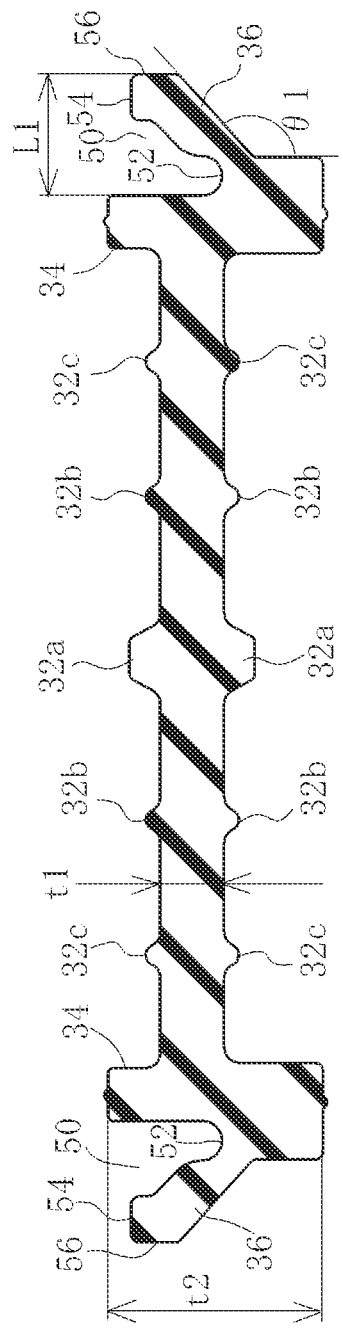
FIG. 7 is a cross sectional view taken on line 7-7 of FIG. 4.
Figure 8:
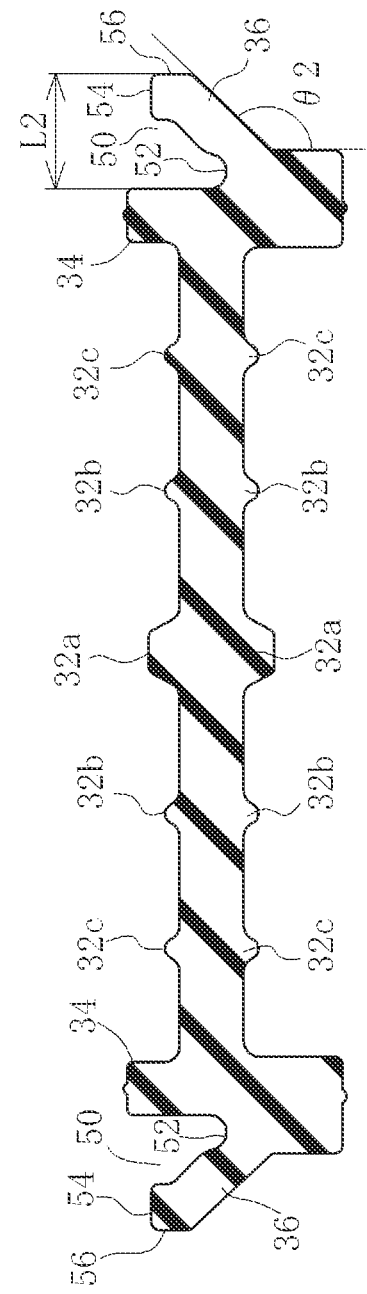
FIG. 8 is a cross sectional view taken on line 8-8 of FIG. 4.
Figure 9:
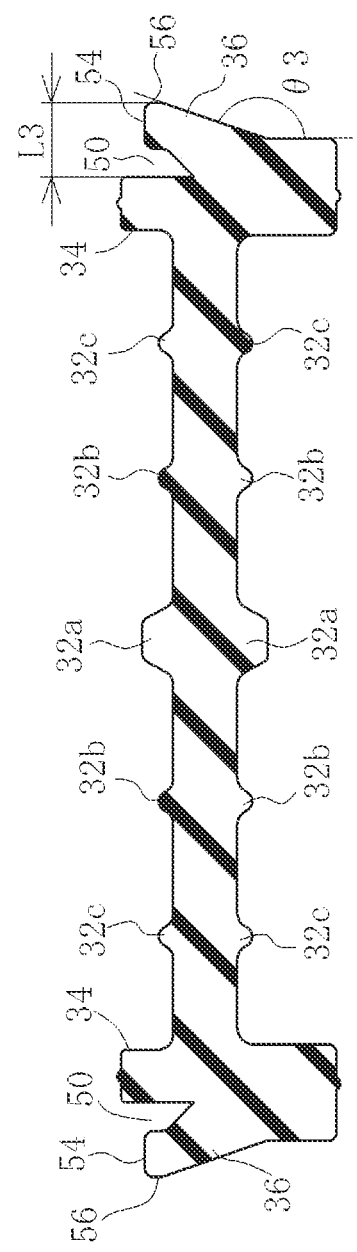
FIG. 9 is a cross sectional view taken on line 9-9 of FIG. 4.

Next, the elastic partition member 30 will be described in detail. FIG. 4 is a plan view of the elastic partition member 30, FIG. 5 is a perspective view thereof, FIG. 6 is a side view thereof, FIG. 7 is a cross sectional view taken on line 7-7 of FIG. 4, FIG. 8 is a cross sectional view taken on line 8-8 of FIG. 4, and FIG. 9 is a cross sectional view taken on line 9-9 of FIG. 4.

By the way, as shown in FIG. 4, orthogonal two axes intersecting at a center O of the elastic partition member 30 shall be X and Y, and directions along an X axis and a Y axis shall be an X direction and a Y direction, respectively.

In FIG. 4, the elastic partition member 30 as a whole is of circular shape in a plan view. An outer circumferential circle formed by an outer circumference of the elastic partition member 30 is designated R. This outer circumferential circle R is partitioned by a straight line section Q forming a chard thereof in such a manner that a part located on the center O side forms the elastic movable diaphragm 32 and that the relief valve 36 is formed in a part (intercept part) of generally crescent shape located radially outwardly of the straight line section Q.

The straight line section Q is formed of a pair of parallel straight line sections which are provided in opposite positions of the outer circumferential circle. This straight line sections Q are formed as a portion of the rigid frame section 34. In the present invention, such a shape that a part of a circle is partitioned by the pair of parallel straight line sections Q like above shall be designated a width across flat shape.

The rigid frame section 34 is also provided in a circular arc section P of the outer circumferential circle R between the pair of straight line sections Q. The circular arc section P is provided also in pairs in opposite positions.

The straight line sections Q and the circular arc sections P form annularly continuous thick wall portions and surround the elastic movable diaphragm 32. However, the rigid frame section 34 is formed in a noncircular ring shape, and the elastic movable diaphragm 32 on the inside is surrounded by the pair of circular arc sections P and the pair of straight line sections Q to thereby be formed in a noncircular shape in a plan view. In the present invention, this shape shall be also referred to as "width across flat shape".

Further, an annular shape shall mean a closed condition in a loop shape and be unconcerned about whether it is a circular ring shape or a noncircular ring shape.

A reference character 34*a* designates a seal projection which project from and is integrally formed on upper and lower surfaces of the rigid frame section 34. This seal projection 34*a* is of circumferentially continuous annular shape.

The elastic movable diaphragm 32 has thick projections 32*a* which project at a center location from upper and lower surfaces thereof so as to be held between the fixing portions 29*g* and 29*h* (FIG. 1), and annular ribs 32*b* and 32*c* which project in concentric circle fashion from the upper and lower surfaces thereof around the center thick projections 32*a*.

The relief valve 36 is located in the outer circumferential part of the elastic partition member 30 and formed radially outwardly of the straight line section Q of the rigid frame section 34. Namely, since the rigid frame section 34 is formed in a width across flat shape, the relief valve 36 is formed by utilizing the remaining part (intercept part) of the outer circumferential circle R partitioned by the straight line section Q, and an outer circumference of the relief valve 36 is located on the outer circumferential circle R of the elastic partition member 30.

To be precise, however, the outer circumference of the relief valve 36 is slightly extended radially outwardly of the outer circumferential circle R in order for securing the sealing performance when closed (see FIG. 3). Accordingly, the relief valve 36 has a relatively shorter circumferential length of substantially ¼ circular arc or less. However, by utilizing the width across flat shape, the relief valve 36 is able to be provided in pairs in the opposite positions located on the outside of each of the straight line sections Q, so that it is possible to secure the sufficient opening area of the relief valve 36.

On a base part of the relief valve 36 connected to the rigid frame section 34 there is formed a bending groove 52 serving as a starting point of a bend of the relief valve 36. This bending groove 52 is formed in substantially a straight line shape in the Y direction along the straight line section Q of the rigid frame section 34. Both end portions 52*a* in the longitudinal direction of the bending groove 52 are gradually narrowed and then disappear while bending inwardly (in the direction of the straight line section Q) (see FIG. 4).

The distal end of an outer circumferential portion of the relief valve 36 is formed with a flat and relatively wide tip edge portion 54. Each end portion in the circumferential direction of the tip edge portion 54 forms an end portion 54*a* in the longitudinal direction of the relief valve 36 and is connected to the straight line section Q of the rigid frame section 34. An inside of the end portion 54*a* in the longitudinal direction is formed in a round shape and connected to the straight line section Q from an outside of each of the end portions 52*a* in the longitudinal direction of the rigid frame section 34.

Further, a depth of the bending groove 52 changes in such a way as to be deepest at a middle portion in the longitudinal direction of the bending groove 52 and to be gradually shallowed toward each of end portions in the longitudinal direction.

Accordingly, a valve length VL which is a width of the relief valve 36 in the radial direction of the elastic partition member 30 changes in the circumferential direction in such a manner that a middle portion in the longitudinal direction (on the X axis in the drawing) is greatest and a part of the end portion 54a in the longitudinal direction connected to the straight line section Q is substantially zero.

As shown in FIGS. 4 and 5, the relief valve 36 is lowered a step at the outside of the straight line section Q of the rigid frame section 34 and formed integral with the rigid frame section 34.

As shown in FIG. 6, a line 36a which designates a part facing the secondary liquid chamber side, of the base of the relief valve 36 connected to a lower portion 34c of the rigid frame section 34, forms a curve of large curvature at a middle portion in the longitudinal direction thereof and suddenly changes at each end portion side in the longitudinal direction thereof in such a way as to be decreased in curvature.

This line 36a also designates a change in depth of the bending groove 52, and it will be understood that the valve length (between the line 36a and an upper surface of a seal surface 56 in this drawing) changes in such a way as to be gradually increased toward the middle portion in the longitudinal direction.

As shown in FIGS. 7 through 9, although the valve length of the relief valve 36 changes in such a way as to be gradually increased from the end portion to the middle portion in the longitudinal direction, this change of the valve length is achieved by the change in the depth of the bending groove 52 and a change construction in valve angle.

Namely, with respect to a valve angle θ (FIG. 10: to be referred to later in detail) of the relief valve 36, when the valve angle of FIG. 7 is θ1, the valve angle of FIG. 8 is θ2 and the valve angle of FIG. 9 is θ3, θ1<θ2<θ3, and the valve angle is gradually increased toward the end portion in the longitudinal direction. This is the change construction in valve angle.

With the above construction, it is possible to change the valve length, and the valve length can be changed so as to be longest at the middle portion in the longitudinal direction. In addition, even if the valve length changes by changing the valve angle, the height of the distal end portion of the relief valve 36 can be maintained at a fixed position.

Therefore, as shown in FIG. 9, at the end portion in the longitudinal direction, the valve length is smallest and the valve angle is largest, so that the bend at the time the relief valve 36 is opened is minimized at the end portion.

Further, as shown in FIG. 7, the general thickness t1 (the thickness of the part excluding the thick projection 32a, the rib 32b and the rib 32c) of the elastic movable diaphragm 32 is smaller than the thickness t2 in the height direction of the rigid frame section 34. This means that the elastic movable diaphragm 32 is thinner than the surrounding rigid frame section 34 and easy to absorb the internal pressure fluctuation of the primary liquid chamber 22 by the elastic deformation, and conversely, that the rigid frame section 34 is thick and forms a rigid part which is sufficient to fix the outer circumferential portion of the elastic movable diaphragm 32.

Figure 10:
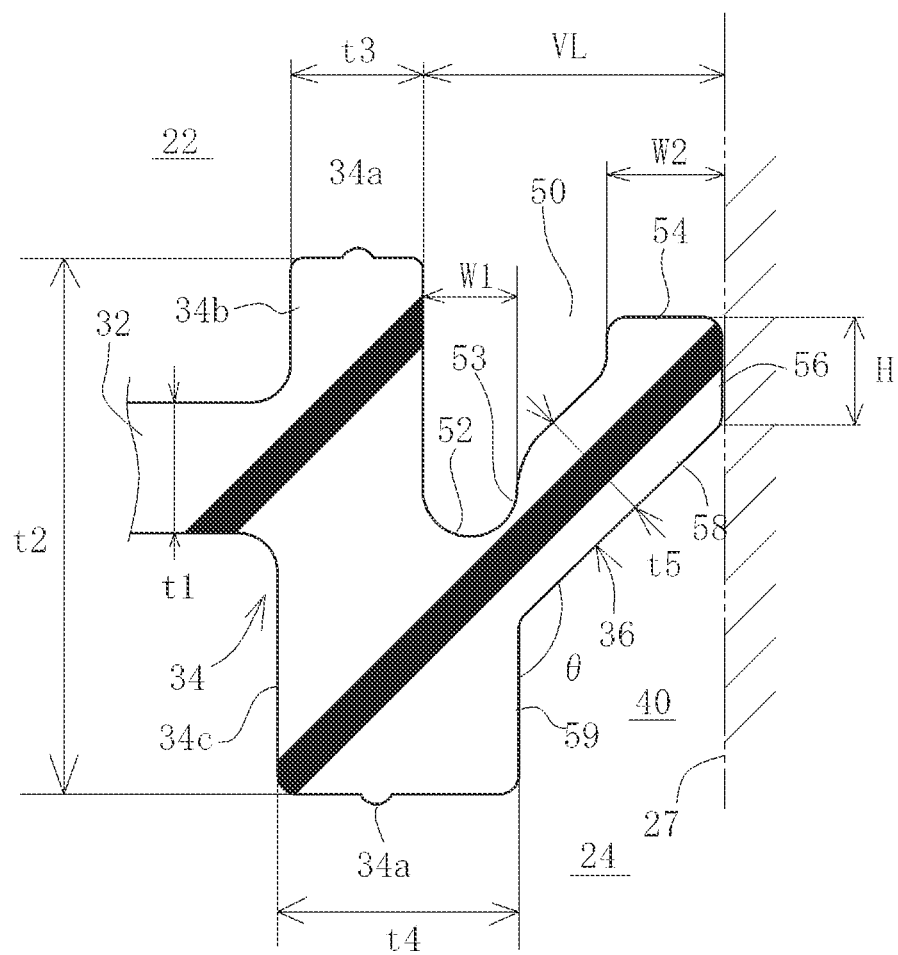
FIG. 10 is an enlarged cross sectional view of a relief valve.
Figure 11:
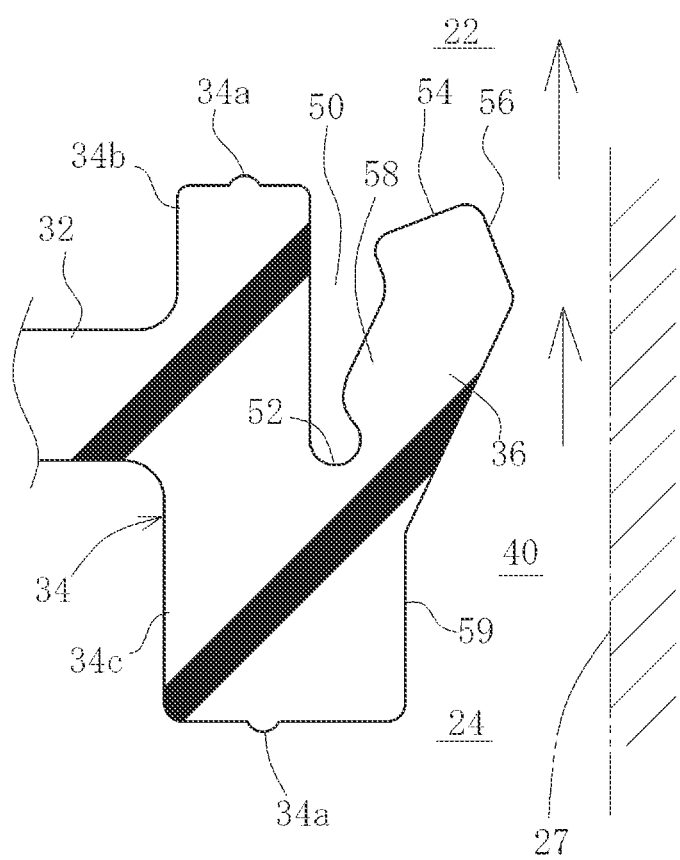
FIG. 11 is a view showing an open condition of the relief valve.

FIG. 10 is an enlarged cross sectional view of the relief valve 36 part, and FIG. 11 is a cross sectional view showing an open condition of the relief valve 36. The relief valve 36, as shown in FIG. 10, is configured to surround a recess 50 of substantially V-shaped cross section which is open toward the primary liquid chamber 22, and integrally formed with the elastic partition member 30 in such a way as to be opened radially outwardly and obliquely upwardly from the rigid frame section 34 toward the primary liquid chamber 22.

The distal end portion of the relief valve 36 has a portion which contacts the inner wall portion 27 facing the leak passage 40 and which forms a seal surface 56. The seal surface 56, in a seated condition on the inner wall portion 27, extends in parallel with the inner wall portion 27 and also in parallel with the center axis L. A height H of the seal surface 56 exerts influence upon the rigidity of the distal end portion of the relief valve 36. Therefore, the height H of the seal surface 56 is adjusted so as to strengthen sealing contact between the relief valve 36 and the inner wall portion 27 when the relief valve 36 is closed, to prevent the leak at the large amplitude vibration which has a relatively large amplitude and which is smaller than the excessive amplitude vibration at the time of not yet cavitation occurrence (normal condition), and to provide such a degree of rigidity that the high damping can be maintained.

An inner circumferential side part of the seal surface 56 extends vertically at intervals of a width W2 of the tip edge portion 54 in a state of having a level difference relative to a main body portion 58.

The rigid frame section 34 is formed of an upper portion 34b located above a bottom portion of the bending groove 52 and the lower portion 34c located below the bottom portion of the bending groove 52. When the thickness of the upper portion 34b is t3 and the thickness of the lower portion 34c is t4, the thickness t3 of the upper portion 34b becomes thinner due to provision of the bending groove 52. On the other hand, the lower portion 34c is thicker by increasing the thickness to a degree of a groove width W1 of the bending groove 52, so that it is substantially equal to or larger than a total (t3+W1) of the thickness t3 and the width W1 of the bending groove 52, namely, (t4≥t3+W1).

The rigidity of the relief valve 36 is heightened with increase in the thickness t4 of the lower portion 34c, whereby the relief valve 36 becomes hard to bend, and particularly, is hard to be deformed downwardly in the drawing by the hydraulic pressure of the primary liquid chamber 22. Therefore, it is possible to prevent the leak more effectively at the time of the normal condition.

However, when the rigidity of the relief valve 36 is heightened, the relief valve 36 is hard to bend in a condition where the cavitation occurs. Therefore, the relationship among the thickness t3, the thickness t4 and the groove width W1 is set up properly by the balance between a degree of rigidity required for leak prevention at the time of the normal condition and bending easiness of the relief valve 36 at the time of the cavitation occurrence condition.

Accordingly, in the case where the bending easiness of the relief valve 36 at the time of the cavitation occurrence condition comes before the requirement of the high-level leak prevention at the time of the normal condition, the opposite relationship (t4<t3+W1) to the above referred relationship may be set up.

Namely, an outer wall 59 of the lower portion 34c is located on substantially the same position (a position overlapping with a downwardly extending line of an outer wall 53) as the outer wall 53 facing the bending groove 52 or on a position radially outwardly of the outer wall 53.

With this construction, the rigidity of the main body portion 58 is adjusted and set up such that it is possible to secure such a degree of rigidity as to be not easily deformable when the seal surface 56 is pushed from the primary liquid chamber 22 side to the secondary liquid chamber 24 side and pressed against the inner wall portion 27, and that the relief valve 36 is easily bent inwardly (toward the upper portion 34b) from the bending groove 52 as a starting point as shown in FIG. 11 by a predetermined hydraulic pressure in the condition where the cavitation occurs when the relief valve 36 is pushed upwardly from the secondary liquid chamber 24 to the primary liquid chamber 22.

By the way, a thickness t5 of the main body portion 58 of the relief valve 36 in this embodiment is larger than t3 and smaller than t4 (t3<t5<t4).

Namely, the main body portion 58 of the relief valve 36 has a relatively large thickness to provide high rigidity, so that it is able to be deformed without local deformation of the whole relief valve 36. Like this, even if the relief valve 36 has the high rigidity, it is easy to be opened by setting of the long valve length VL or provision of the bending groove 52, etc.

In addition, the thickness t5 of the main body portion 58 of the relief valve 36 is smaller than t1 of the elastic movable diaphragm 32. However, this relationship of thickness may be varied freely according to specifications.

As shown in FIG. 10, an angle formed by a lower surface of the main body portion 58 of the relief valve 36 and an outer wall 59 of the lower portion 34c is a valve angle θ. This valve angle θ, as described hereinbefore with reference to FIGS. 7 to 9, is smallest at the middle portion in the longitudinal direction and changes in such a way as to be gradually increased toward the end portions in the longitudinal direction, so that the valve angle θ3 of the end portion in the longitudinal direction is largest whereby the relief valve 36 is in an almost perpendicular condition where it is slightly opened, and the valve length is smallest.

Like this, the end portions in the longitudinal direction of the relief valve 36 having the largest valve angle θ3 are configured to be opened even by slight deformation.

FIG. 11 illustrates the opened condition of the relief valve 36. When the cavitation occurrence condition is created and the primary liquid chamber 22 temporarily turns to a negative pressure, the relief valve 36 is pushed up due to the absorption from the side of the primary liquid chamber 22 and the hydraulic pressure on the side of the secondary liquid chamber 24 having a large difference in hydraulic pressure, so that the main body portion 58 is bent toward the upper portion 34b from the bending groove 52 as the starting point. Then, the seal surface 56 is brought out of contact with the inner wall portion 27 whereby to allow the leak passage 40 to be opened. Therefore, the liquid in the secondary liquid chamber 24 is leaked rapidly to the primary liquid chamber 22, so that the internal pressure of the primary liquid chamber 22 is increased so as to dissipate the negative pressure to thereby prevent the cavitation.

Figure 12:
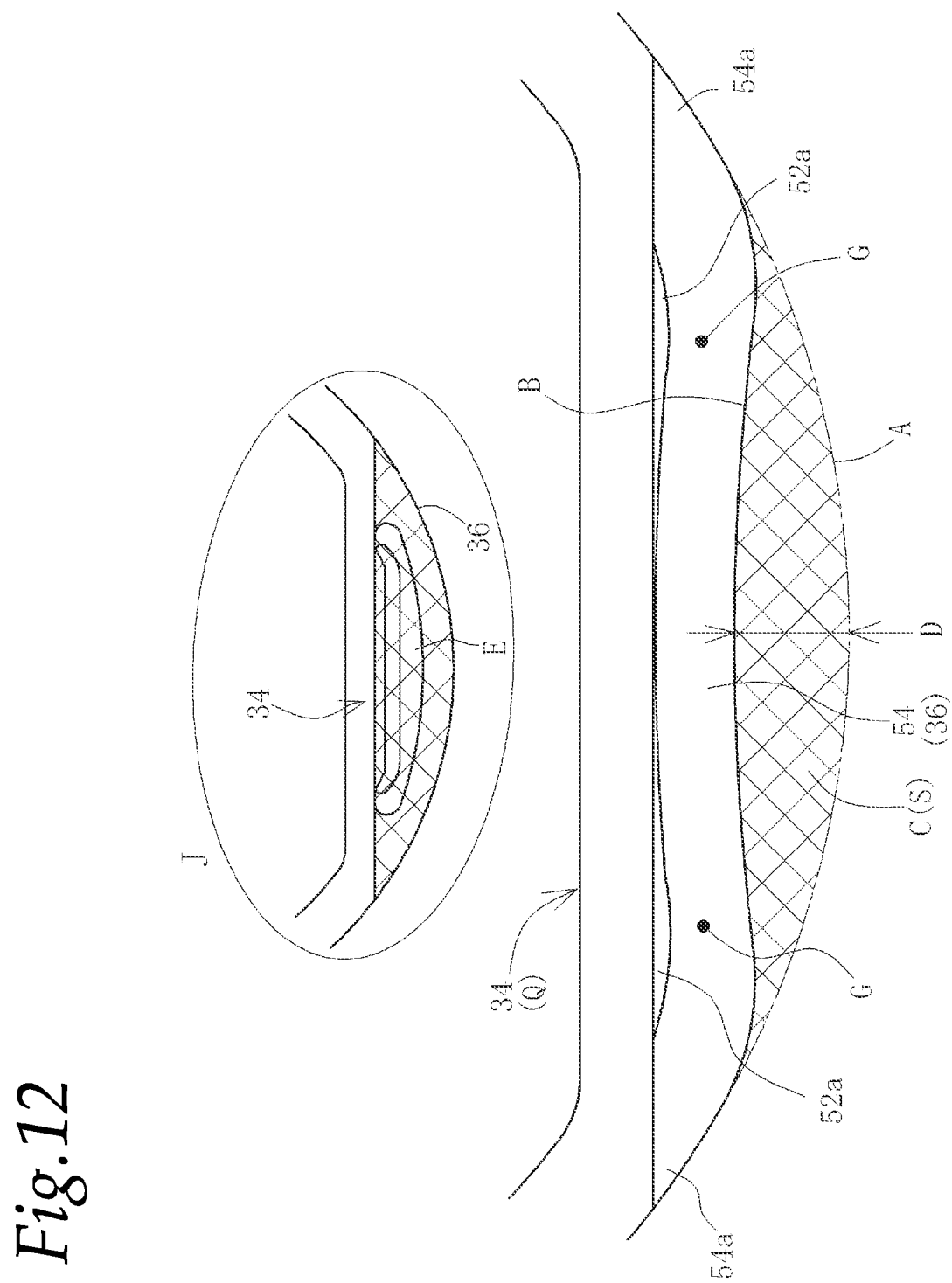
FIG. 12 is a view of assistance in explaining an opening area of the relief valve.

FIG. 12 is a view of assistance in explaining the open condition and valve opening rate of the relief valve 36. This drawing illustrates the open condition of the relief valve 36 in a plan view. The deformation of the relief valve 36 starts at the middle portion in the longitudinal direction which is lowest in rigidity. Since the rigidity of the relief valve 36 is gradually increased as approaching the end portions in the longitudinal direction, the opening of the relief valve 36 is expanded gradually from the middle portion in the longitudinal direction to the end portions in the longitudinal direction. Then, the end portions in the longitudinal direction having the highest rigidity are opened most slowly.

However, since the valve length changes in the circumferential direction in such a manner that the middle portion in the longitudinal direction is longest and the end portions in the longitudinal direction are shortest, the amount of deformation is largest at the middle portion in the longitudinal direction and smallest at the end portions in the longitudinal direction. At the time of the maximum opening, substantially the whole circumferential portion of the relief valve 36 is bent in such a way as to approach and overlap with the straight line section Q of the upper portion 34b of the rigid frame section 34 and to be opened substantially uniformly.

At that time, the tip edge portion 54 of the relief valve 36 forms incomplete operating portions G in the vicinity of the end portions 54a in the longitudinal direction while leaving a slight clearance between itself and the upper portion 34b. This incomplete operating portion is inevitably produced since the end portions in the longitudinal direction of the relief valve 36 have the high rigidity.

Figure 17:
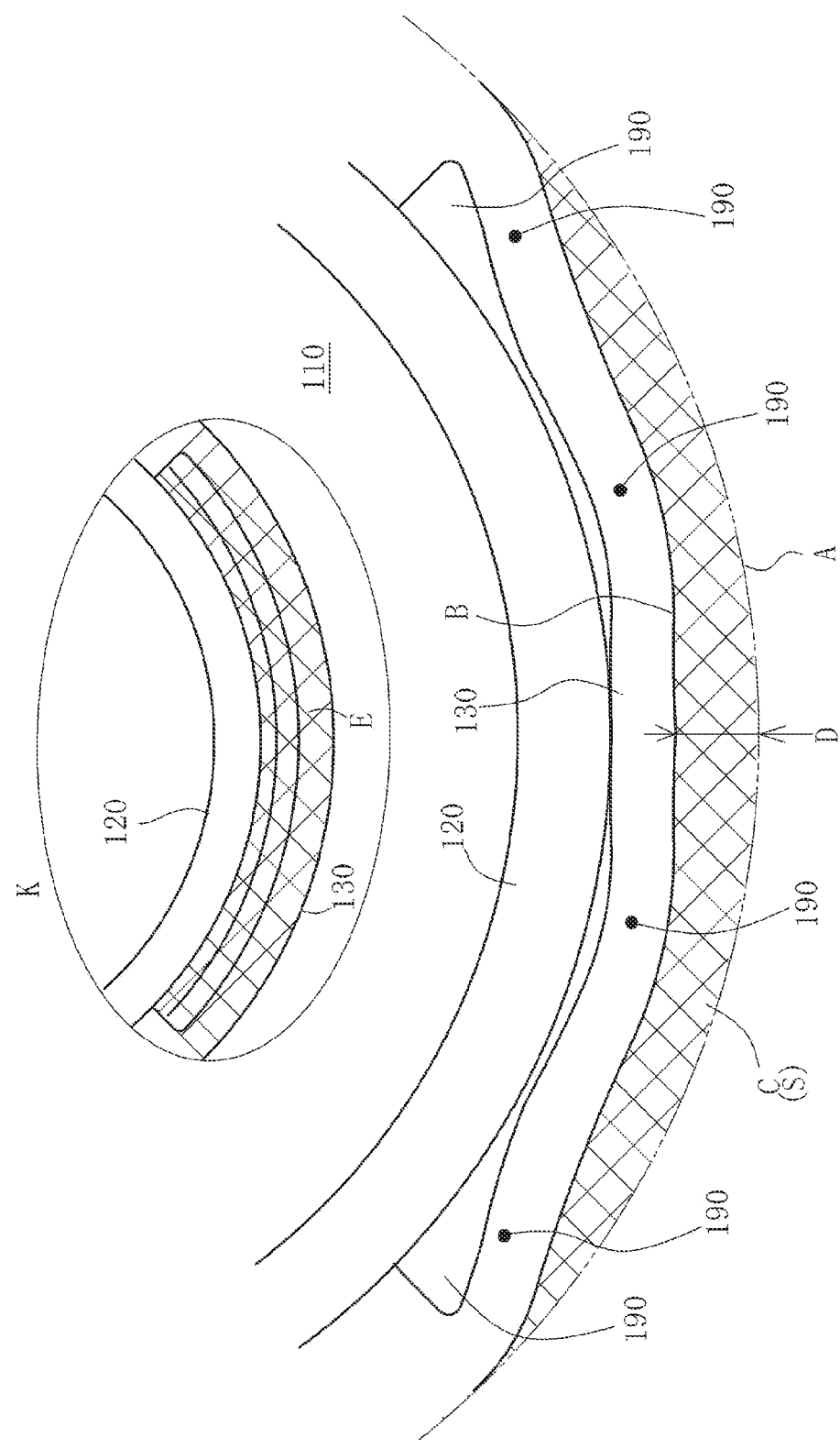
FIG. 17 is a view of assistance in explaining an opening area of a relief valve according to the prior art example.

However, in the present invention, since the valve angle of the end portion 54a is determined large from the first so that the end portion 54a is in the almost perpendicular condition where it is not opened too much and the valve length is shortest, the end portions 54a are able to be opened by the slight deformation. Therefore, the incomplete operating portions G are small in comparison with the prior art example (reference character 190 of FIG. 17), so that an opening area can be increased accordingly.

By the way, although a part of an end portion 52a in the longitudinal direction of the bending groove 52 is seen in the incomplete operating portion G, the end portion 52a in the longitudinal direction is previously bent inwardly to escape to the inside, so that the deformation of the end portion 54a in the longitudinal direction is easily carried out so as to contribute to the decrease in creation of the incomplete operating portion G.

A reference character A in the drawing designates the closed condition of the relief valve 36 and B designates the opened condition. A region C shown by hatching between A and B is a valve opening part, and an area of this part is the valve opening area S.

As will be apparent from this drawing, the maximum amount of displacement D is increased and the valve opening area S becomes sufficiently large. Herein, the amount of displacement is the amount of opening of the relief valve 36 and corresponds to the valve length. Therefore, the amount of displacement is largest at the middle portion in the longitudinal direction so as to be the maximum amount of displacement D and gradually decreased toward the end portions in the longitudinal direction. In addition, the opening area also changes in such a way as to be gradually decreased from the middle portion in the longitudinal direction to the end portions in the longitudinal direction.

Herein, as shown in an enlarged part of the drawing, when an initial valve area in the closed condition is E, approximately S=138 mm$^2$ and E=163 mm$^2$ can be given as concrete numerical examples. In this case, the valve opening rate F=S/E=about 85%, so that the opening rate is increased.

Accordingly, it is apparent that the relief valve 36 is easy to be opened.

By the way, although the initial valve area E is decreased in comparison with the prior art example, even if the relief valve 36 is decreased in size, almost the full length of the relief valve 36 is able to be opened and the incomplete operating portion G at the time of the maximum opening is able to be decreased. Therefore, the valve opening rate is increased to thereby improve the valve performance. Accordingly, even if the relief valve 36 is relatively decreased in size by enlarging the area of the elastic movable diaphragm 32, the valve opening rate can be relatively increased, and it is shown that the cavitation preventing effect can be obtained sufficiently.

Figure 13:
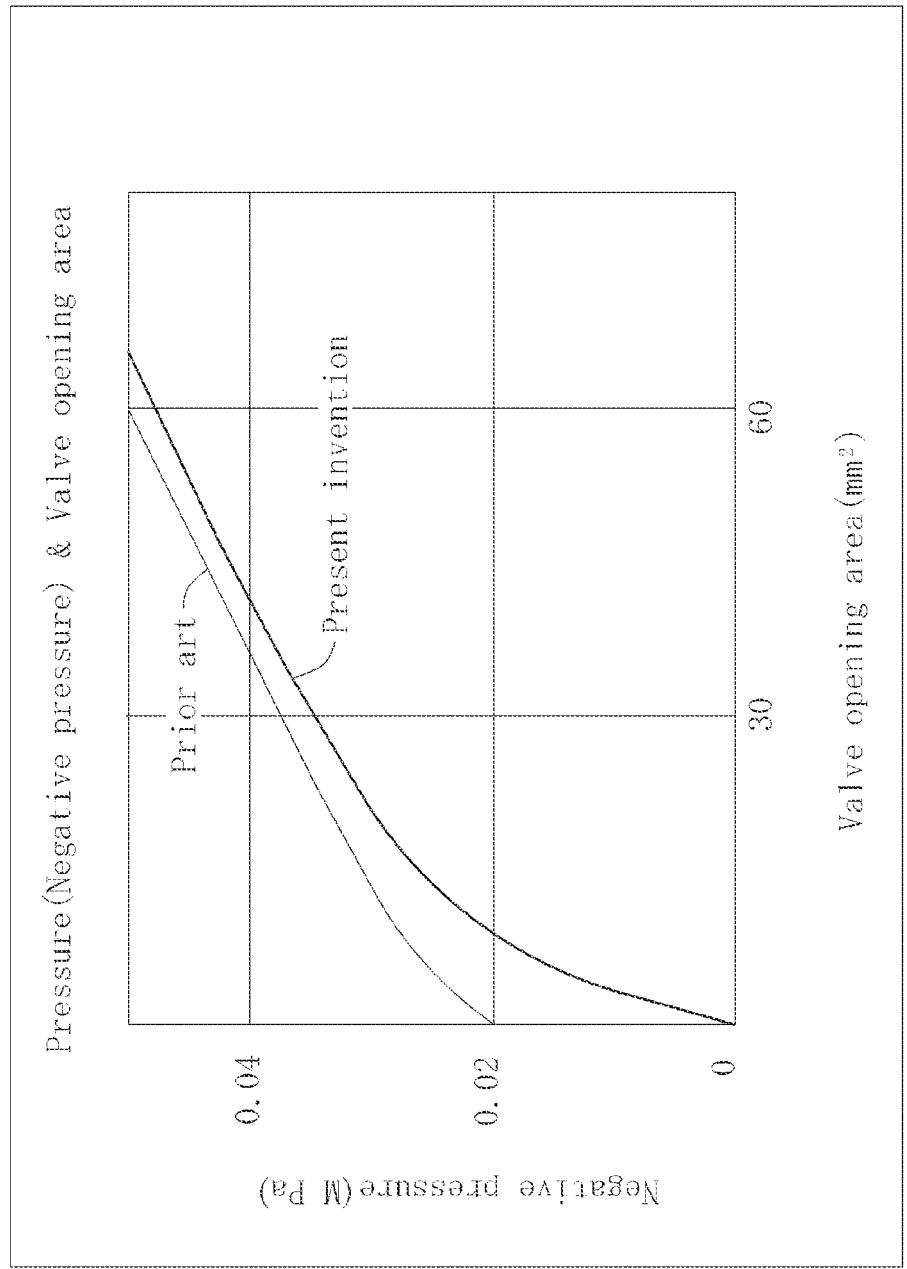
FIG. 13 is a graph indicating valve performance of the present invention.

FIG. 13 is a graph indicating the valve performance, in which a vertical axis is a negative pressure (MPa) which is produced in the primary liquid chamber in the condition where the cavitation occurs, and a horizontal axis is the opening area ($mm^2$, a square millimeter) of the relief valve. Herein, graduations of negative pressure in the graph and the negative pressure in the following description shall be an absolute value. The relief valve in the present invention, as will be apparent as compared with a prior art example which is also shown in the graph, is opened from a small negative pressure, and the opening area is gradually increased in accordance with the increase in negative pressure. Then, the opening area is rapidly increased from a predetermined negative pressure (a neighborhood of 0.02 MPa in the graph). Although this change of rapid increasing part is similar to the prior art example, the opening area is increased more than the prior art example.

Accordingly, the relief valve in the present invention can start opening at an early timing of relatively small pressure (negative pressure). Then, the whole relief valve in the circumferential direction can be opened by being opened slowly at first, and thereafter, the opening area is rapidly extended. Thus, the relief valve in the present invention demonstrates the excellent valve performance suitable for preventing the cavitation.

Figure 14:
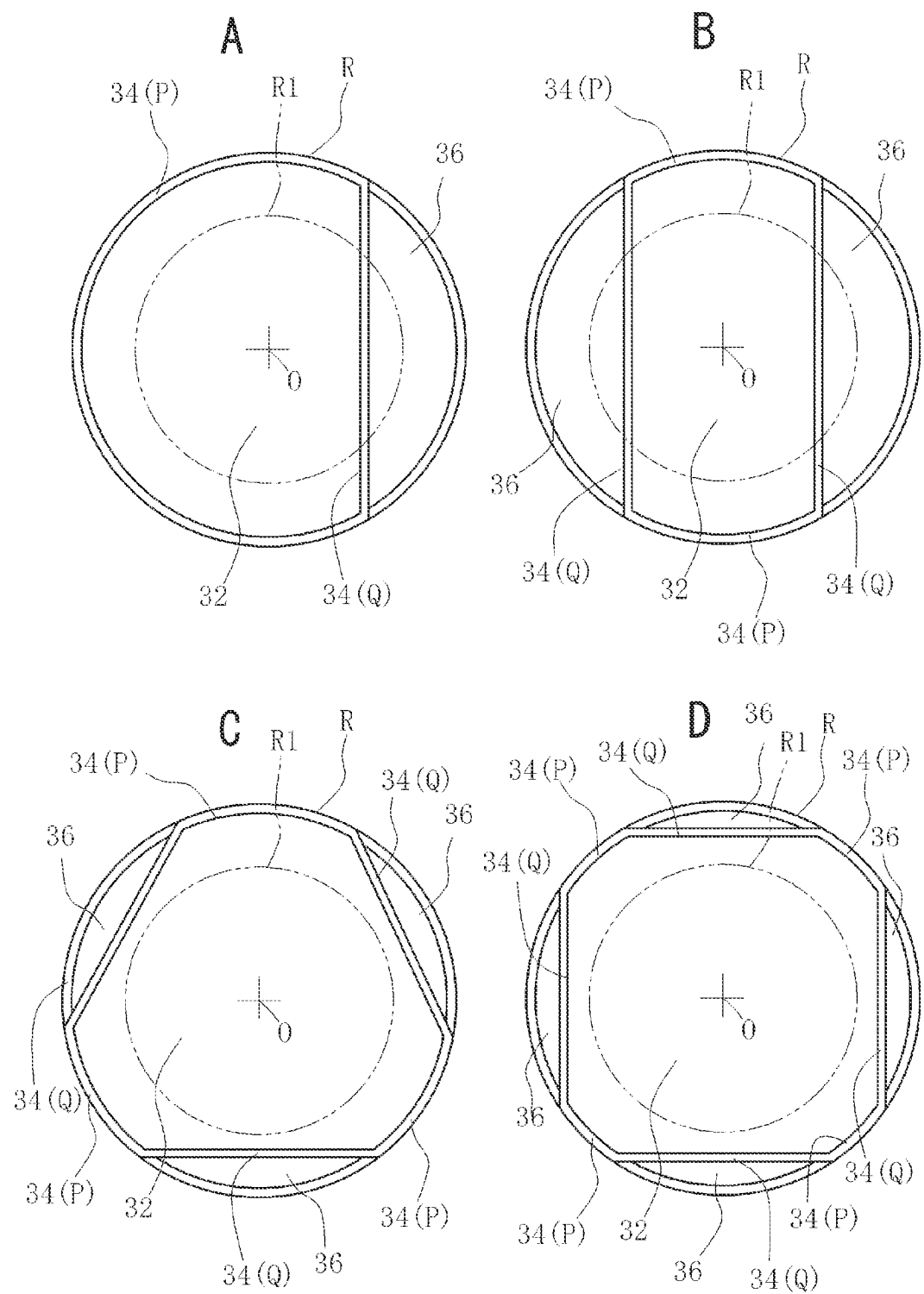
FIG. 14 is an illustration of the principle of the present invention.

FIG. 14 is a view theoretically illustrating the increase in area of the elastic movable diaphragm 32. In accordance with the number of straight line sections, examples A, B, C and D are shown. For instance, the example of FIG. 14-B is formed in a width across flat shape by two straight line sections and corresponds to the embodiment of the present invention. In this drawing, the elastic partition member 30 is of circular shape in a plan view and has the outer circumferential part forming the outer circumferential circle R. The straight line section Q is provided as a chord of the outer circumferential circle R. The elastic movable diaphragm 32 is provided on the center O side of the elastic partition member 30 partitioned by the straight line section Q, and the relief valve 36 is provided in the intercept part of generally crescent shape surrounded by the arc located radially outwardly of the straight line section Q.

The periphery of the elastic movable diaphragm 32 is rimmed with the rigid frame section 34 of noncircular ring shape formed of the straight line section Q and the circular arc section P which is a partial arc of the outer circumferential circle.

With this construction, the elastic movable diaphragm 32 is formed in a noncircular shape (width across flat shape) surrounded by the straight line section Q and the circular arc section P. In the prior art example in which the elastic movable diaphragm has the same outer diameter, a concentric circle section shown by a phantom line R1 is the rigid frame section, and the relief valve is provided outwardly of the rigid frame section. Therefore, the elastic movable diaphragm is an inside portion of the concentric circle shown by the phantom line R1, so that an area of the elastic movable diaphragm is smaller than that of the embodiment of the present invention. Namely, the elastic movable diaphragm 32 of this embodiment is able to have a larger area in comparison with the prior art example.

Especially, since the circular arc section P corresponds to the outer circumferential part of the elastic partition member 30, even if the rigid frame section 34 is provide in the periphery of the elastic movable diaphragm 32, the area of the elastic movable diaphragm 32 is able to be extended sufficiently to the circular arc section P in the radial direction. As a result, although the relief valve 36 is integrally provided in the outer circumferential part of the elastic partition member 30, the area of the elastic movable diaphragm 32 can be secured sufficiently to thereby lower the dynamic spring.

By the way, the number of this straight line section Q is not limited to a single straight line section, and a plurality of straight line sections Q such as two straight line sections as shown in FIG. 14-B, three straight line sections as shown in FIG. 14C, four straight line sections as shown in FIG. 14-D, etc. may be selected freely. Although the area of each of the relief valves 36 is reduced with increase in the number of the straight line section, the number of the relief valve 36 is able to be increased whereby it is also possible to expand the opening area as a whole.

Next, the operation of this embodiment will be described.

In the case where the engine mount according to this embodiment is loaded on the vehicle, when the low frequency large amplitude vibration such as a shake vibration is inputted, the hydraulic liquid in the primary liquid chamber 22 flows through the damping orifice 28 between the primary liquid chamber 22 and the secondary liquid chamber 24 since the rigidity of the elastic movable diaphragm 32 is adjusted previously not to be elastically deformed by this vibration, and the liquid column resonance is created by the damping orifice 28 to thereby achieve the high damping.

In addition, the relief valve 36, as shown in FIG. 10, is maintained in a condition where the seal surface 56 is in sealing contact with the inner wall portion 27. Therefore, the leak is prevented so as to make it possible to achieve the high damping.

When the high frequency small amplitude vibration such as a booming noise is inputted, since the damping orifice 28 is clogged and the internal pressure of the primary liquid chamber 22 rises up, the elastic movable diaphragm 32 is elastically deformed to absorb this vibration whereby to achieve the low dynamic spring.

At that time, the elastic movable diaphragm 32 is formed in a width across flat shape and extended partially up to the outer circumferential part of the elastic partition member 30.

Next, when the excessive amplitude vibration is inputted, the cavitation occurrence condition is produced, and the valve opening rate of the relief valve 36 is increased so as to heighten the valve performance. Therefore, as shown in FIG. 11, the relief valve 36 is pushed up by the hydraulic pressure on the secondary liquid chamber 24 side to open the leak passage 40, so that the hydraulic liquid is rapidly leaked from the secondary liquid chamber 24 to the primary liquid chamber 22. Then, the internal pressure of the primary liquid chamber 22 is raised so as to dissolve the negative pressure, whereby the cavitation is prevented.

In addition, the valve performance of the relief valve 36 is improved as shown in FIG. 13. This improvement in the valve performance is realized by changing the valve angle in such a way as to be gradually decreased toward the middle portion in the longitudinal direction and by changing the valve length in such a way as to be gradually increased toward the middle portion in the longitudinal direction.

Namely, since the middle portion in the longitudinal direction of the relief valve 36 is greatest in valve length and lowest in valve rigidity, the relief valve 36 is able to be opened at this middle portion even by the small pressure, and the opening timing becomes faster.

As shown in FIG. 9, since the end portions in the longitudinal direction of the relief valve 36 are largest in valve angle θ3 so as to be in an almost upstanding condition and smallest in valve length L3, the small amount of bending is sufficient to be opened, so that the relief valve 36 can be opened by the deformation of a slight degree of bending whereby the incomplete operating portion G (FIG. 12) can be decreased.

Accordingly, as shown in FIG. 12, at the time of the maximum opening of the relief valve 36, even the end portions in the longitudinal direction having the high rigidity can be opened by the slight deformation whereby to decrease the incomplete operating portion G.

For this reason, the incomplete operating portion G which is an obstacle to bending at the time the relief valve 36 is opened is decreased, so that the relief valve 36 can be opened throughout its full length including the end portions 54a.

By the way, since the end portions 52a of the bending groove 52 are bend inwardly, the decrease of the incomplete operating portion G is realized also by lessening the resistance at the time the end portions 54a in the longitudinal direction are bent.

Further, the valve length is changed in such a way as to be gradually shortened from the middle portion in the longitudinal direction to each of the end portions in the longitudinal direction of the relief valve 36. Therefore, since the relief valve 36 changes in rigidity in such a way as to be heightened gradually from the middle portion in the longitudinal direction to each of the end portions in the longitudinal direction, the middle portion in the longitudinal direction is opened first by the small pressure as a leading portion of opening, and then, the opening area is extended toward the end portions 54a in the longitudinal direction with increase in pressure, so that the whole relief valve in the longitudinal direction can be opened smoothly.

Accordingly, the leak can be prevented at the time of the large amplitude vibration. Even if the rigidity is set up to the degree which is capable of maintaining the high damping, the prompt leak is carried out by rapidly opening the middle portion in the longitudinal direction in the condition where the cavitation occurs, so that the generation of bubbles which is the cause of cavitation can be decreased as much as possible.

Further, since the valve length is changed in such a way as to be gradually lengthened toward the middle portion in the longitudinal direction, the valve rigidity is changed in such a way as to be gradually lowered toward the middle portion in the longitudinal direction, so that the opening area on the side of the middle portion in the longitudinal direction can be increased and the incomplete operating portion can be reduced on the side of the end portions in the longitudinal direction. Therefore, the relief valve can be opened uniformly substantially over the full length thereof.

As a result, the flow resistance at the time of leakage is decreased, whereby the occurrence of the cavitation can be reduced.

In addition, since the relief valve 36 is opened from the middle portion in the longitudinal direction as the leading portion of opening, to the end portions in the longitudinal direction, it is easy to be opened at the full length thereof, and the region in which the incomplete operating portion G is created is limited to only the end portions in the longitudinal direction and so reduced.

Moreover, since the base portion of the relief valve 36 is formed substantially by the straight line section Q, the relief valve 36 is easy to be opened smoothly up to each of the end portions in the longitudinal direction as compared with the case where the base portion is formed long in the arc shape.

Further, since the elastic movable diaphragm 32 is formed in the noncircular shape and a portion of the elastic movable diaphragm 32 is extended to a portion of the outer circumferential part of the elastic partition member 30, the area of the elastic movable diaphragm 32 is enlarged sufficiently thereby making it possible to realize the sufficiently low dynamic spring.

Figure 15:
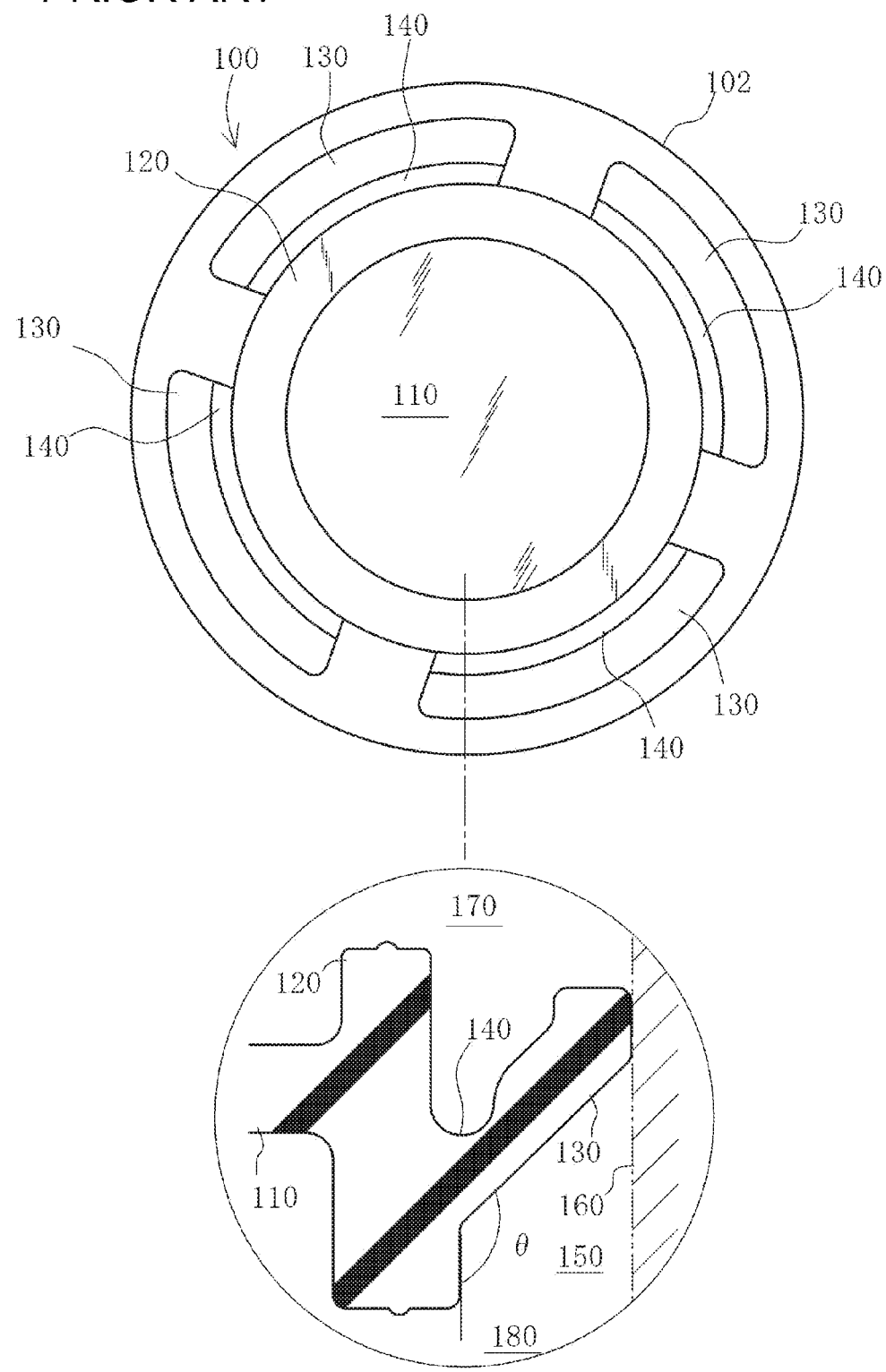
FIG. 15 is a plan view of an elastic partition member according to a prior art example.
Figure 16:
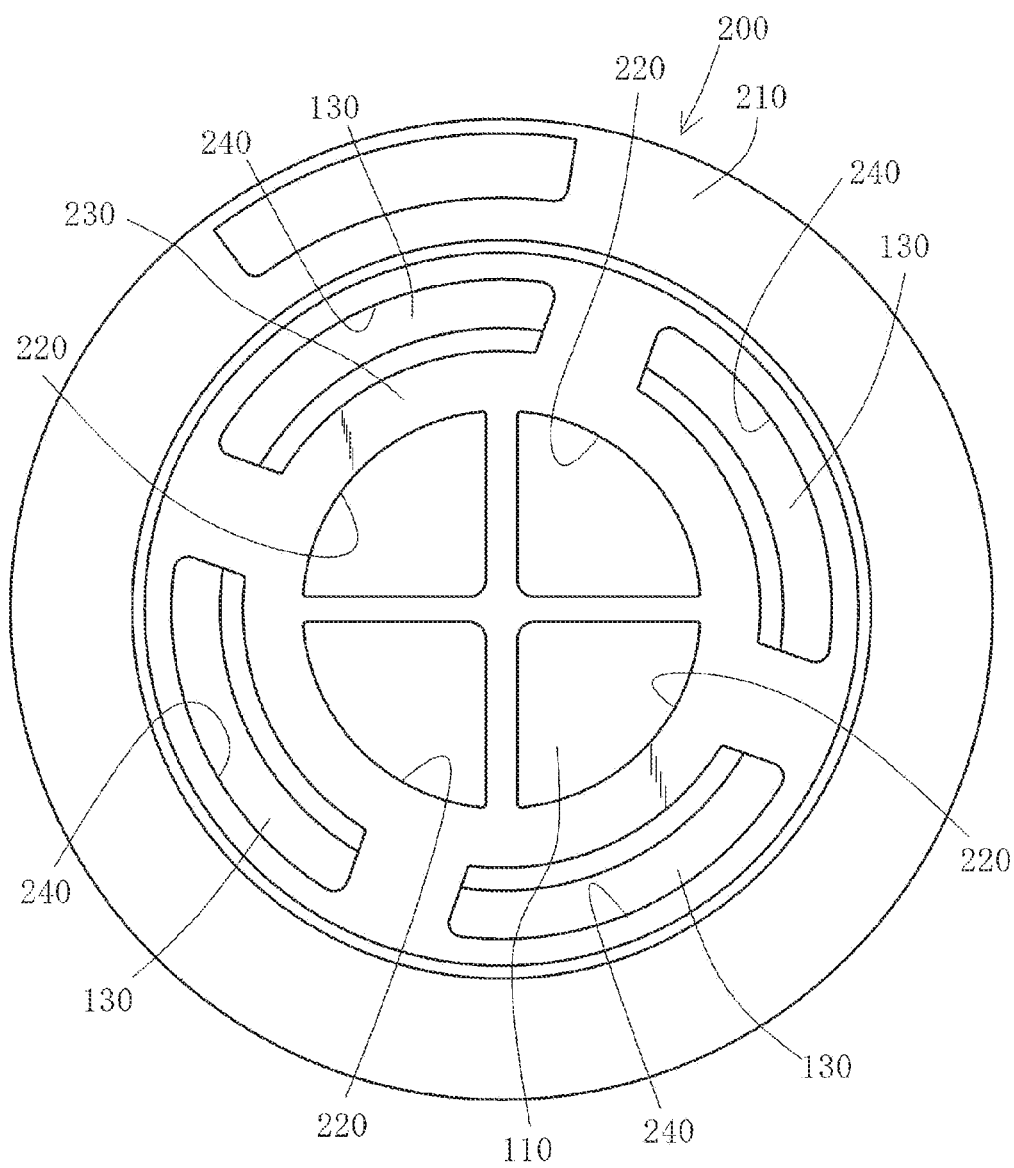
FIG. 16 is a plan view of a partition member according to the prior art example.

For this reason, there are no disadvantages as seen in the prior art example of FIG. 15 in that the area of the elastic movable diaphragm 110 is diminished by having the relief valve 130 arranged concentrically on the outside of the elastic movable diaphragm 110, and conversely, the elastic partition member 100 is enlarged in diameter.

At that time, the thick rigid frame section 34 of noncircular shape which is formed of the circular arc section P and the straight line section Q is located in the outer circumferential part of the elastic partition member 30 and provided integral with elastic partition member 30 while surrounding the elastic movable diaphragm 32. Therefore, when this rigid frame section 34 is fixed, the periphery of the elastic movable diaphragm 32 of noncircular shape can be fixed.

Further, the relief valve 36 corresponds to the intercept part of the outer circumferential circle R formed of the straight line section Q and the circular arc which is an extension of the circular arc section P. Therefore, the relief valve 36 is more widely opened than the case where it is formed in the circular arc shape as shown in FIG. 15 whereby the valve opening rate is increased and the valve performance is improved. Moreover, by forming the relief valve 36 into the intercept shape, even if the length in the longitudinal direction is shortened, the relief valve 36 can maintain the predetermined initial area. Therefore, the relief valve 36 is able to be shortened relatively by shortening the length in the longitudinal direction, so that the relief valve 36 can be decreased in size while maintaining the predetermined valve performance.

Accordingly, the increase in area of the elastic movable diaphragm and the increase in initial area of the relief valve 36 are compatible. In addition, when the area of the elastic movable diaphragm 32 is equal to that of the prior art example, the relief valve 36 can be provided in the outer circumferential part of the elastic partition member 30 and formed integral with the elastic movable diaphragm 32. Then, the partition member 20 can be decreased in size while maintaining the initial area of the relief valve 36 to the predetermined degree.

Therefore, in the elastic partition member 30 which is integrally provided with the elastic movable diaphragm 32 and the relief valve 36, the relief valve 36 can be decreased in size by raising the valve opening rate of the relief valve 36 and by improving the valve performance. As a result, both objectives of the improvement of the low dynamic spring characteristic due to the increase in area of the elastic movable diaphragm 32 and the reliable prevention of the cavitation due to the improvement of the valve performance, which are seldom compatible with each other, can be achieved simultaneously.

By the way, it is to be understood that the present invention is not limited to each of the above embodiments and that various changes and modifications may be made without departing from the spirit and scope of the invention. For instance, the elastic movable diaphragm 32 is not necessarily limited to the width across flat shape. As shown in FIG. 14-A, by utilizing a single straight line section Q as a chord of the outer circumferential circle R, the elastic movable diaphragm 32 of cutout circular shape may be formed on the center O side partitioned by this straight line section Q, and the relief valve 36 may be formed in the intercept part of crescent shape surrounded by the arc located radially outwardly of the straight line section Q.

With this construction, the elastic movable diaphragm 32 is able to have a large area of noncircular shape surrounded by the straight line section Q and the circular arc section P.

Further, FIG. 14-C is an example provided with three straight line sections Q, in which three intercept parts of crescent shape are formed and three relief valves 36 are provided in these intercept parts, respectively. The elastic movable diaphragm 32 is able to have a large area of noncircular, generally triangular shape surrounded by the three straight line sections Q and the three circular arc sections P.

FIG. 14-D is an example provided with four straight line sections Q, in which four intercept parts of crescent shape are formed and four relief valves 36 are provided in these intercept parts. The elastic movable diaphragm 32 is able to have a large area of noncircular, generally square shape surrounded by the four straight line sections Q and the four circular arc sections P.

Like this, the number of the straight line section can be freely selected.

Further, the circular arc section P is not limited to a circular arc. An elliptical arc section or a curved section formed of various types of curves other than the circular arc and elliptical arc may be utilized in combination with the straight line section Q.

By the way, with respect to FIGS. 14-A to 14-D, as described above, the periphery of each of the elastic movable diaphragms 32 is rimmed with the rigid frame section 34 of noncircular ring shape.

In addition, this liquid sealed vibration isolating device is not limited to the engine mount but may be applied to various kinds of devices such as a suspension mount, etc.

Further, the change in valve length may be achieved without changing the valve angle. For instance, it may be achieved by having the bending groove 52 provided with a straight line portion which extends in parallel with the straight line section Q.

Namely, when the bending groove 52 is provided with the straight line portion, in a plan view the relief valve 36 is of intercept shape surrounded by the straight line portion on the inside thereof and a circular arc portion on the outside thereof, and the valve length is formed by a distance from the straight line portion to the circular arc portion. Therefore, the valve length is configured to be changeable.

What is claimed is:

1. A liquid sealed vibration isolating device comprising:
   a partition member for partitioning a liquid chamber into a primary liquid chamber and a secondary liquid chamber,
   a damping orifice being arranged in the partition member to provide communication between the primary liquid chamber and the secondary liquid chamber,
   an elastic partition member being provided in the partition member, the elastic partition member being integrally provided with an elastic movable diaphragm which absorbs an internal pressure of the primary liquid chamber and a relief valve which is arranged in an outer circumferential part, and
   a leak passage to be opened and closed by the relief valve, being arranged in the partition member to provide communication between the primary liquid chamber and the secondary liquid chamber,
   wherein the elastic movable diaphragm is formed in a noncircular shape and is surrounded by an annular rigid frame section, said annular rigid frame section having a noncircular shape formed by a curved line portion and a straight line section, and the relief valve is provided in a part located outwardly of the straight line section and formed in an oblong shape along an outer circumference of the elastic partition member.

2. The liquid sealed vibration isolating device according to claim 1, wherein the elastic partition member is formed in a circular shape, the curved line portion is formed of a circular arc section corresponding to a portion of an outer circumferential circle of the elastic partition member, and the straight line section forms a chord of the outer circumferential circle.

3. The liquid sealed vibration isolating device according to claim 1, wherein a valve length which is a length of the relief valve is increased as approaching a middle portion in the longitudinal direction of the relief valve.

4. The liquid sealed vibration isolating device according to claim 3, wherein the relief valve extends outwardly in the radial direction of elastic movable diaphragm in such a way as to be opened in spreading fashion toward the primary liquid chamber, wherein a valve angle which is an opening angle of the relief valve changes so as to be gradually decreased as approaching the middle portion in the longitudinal direction.

5. The liquid sealed vibration isolating device according to claim 1, further comprising a bending groove being provided in a base portion of the relief valve, wherein the bending groove is opened toward the primary liquid chamber and has a straight line portion extending in parallel with the straight line section.

6. The liquid sealed vibration isolating device according to claim 5, wherein both end portions in the longitudinal direction of the bending groove are bent toward the elastic movable diaphragm.

7. The liquid sealed vibration isolating device according to claim 1, wherein the straight line sections are located in pairs in opposite positions across a center of the elastic partition member, and the elastic movable diaphragm is formed in a width across flat shape having the pair of straight line sections.

8. The liquid sealed vibration isolating device according to claim 2, wherein a valve length which is a length of the relief valve is increased as approaching a middle portion in the longitudinal direction of the relief valve.

9. The liquid sealed vibration isolating device according to claim 8, wherein the relief valve extends outwardly in the radial direction of elastic movable diaphragm in such a way as to be opened in spreading fashion toward the primary liquid chamber, wherein a valve angle which is an opening angle of the relief valve changes so as to be gradually decreased as approaching the middle portion in the longitudinal direction.

10. The liquid sealed vibration isolating device according to claim 2, further comprising a bending groove being provided in a base portion of the relief valve, wherein the bending groove is opened toward the primary liquid chamber and has a straight line portion extending in parallel with the straight line section.

11. The liquid sealed vibration isolating device according to claim 10, wherein both end portions in the longitudinal direction of the bending groove are bent toward the elastic movable diaphragm.

12. The liquid sealed vibration isolating device according to claim 3, further comprising a bending groove being provided in a base portion of the relief valve, wherein the bending groove is opened toward the primary liquid chamber and has a straight line portion extending in parallel with the straight line section.

13. The liquid sealed vibration isolating device according to claim 12, wherein both end portions in the longitudinal direction of the bending groove are bent toward the elastic movable diaphragm.

14. The liquid sealed vibration isolating device according to claim 4, further comprising a bending groove being provided in a base portion of the relief valve, wherein the bending groove is opened toward the primary liquid chamber and has a straight line portion extending in parallel with the straight line section.

15. The liquid sealed vibration isolating device according to claim 14, wherein both end portions in the longitudinal direction of the bending groove are bent toward the elastic movable diaphragm.

16. The liquid sealed vibration isolating device according to claim 2, wherein the straight line sections are located in pairs in opposite positions across a center of the elastic partition member, and the elastic movable diaphragm is formed in a width across flat shape having the pair of straight line sections.

17. The liquid sealed vibration isolating device according to claim 3, wherein the straight line sections are located in pairs in opposite positions across a center of the elastic partition member, and the elastic movable diaphragm is formed in a width across flat shape having the pair of straight line sections.

18. The liquid sealed vibration isolating device according to claim 4, wherein the straight line sections are located in pairs in opposite positions across a center of the elastic partition member, and the elastic movable diaphragm is formed in a width across flat shape having the pair of straight line sections.

19. The liquid sealed vibration isolating device according to claim 5, wherein the straight line sections are located in pairs in opposite positions across a center of the elastic partition member, and the elastic movable diaphragm is formed in a width across flat shape having the pair of straight line sections.

20. The liquid sealed vibration isolating device according to claim 6, wherein the straight line sections are located in pairs in opposite positions across a center of the elastic partition member, and the elastic movable diaphragm is formed in a width across flat shape having the pair of straight line sections.

* * * * *